US012083810B2

(12) United States Patent
Iijima

(10) Patent No.: US 12,083,810 B2
(45) **Date of Patent: *Sep. 10, 2024**

(54) PRINTING DEVICE INCLUDING POWER TRANSMISSION MECHANISM CONFIGURED TO SWITCH ROTATION SPEED OF PLATEN ROLLER IN ASSOCIATION WITH ATTACHMENT OF CASSETTE

(71) Applicant: BROTHER KOGYO KABUSHIKI KAISHA, Nagoya (JP)

(72) Inventor: Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,259

(22) Filed: Oct. 26, 2021

(65) Prior Publication Data

US 2022/0134772 A1 May 5, 2022

(30) Foreign Application Priority Data

Oct. 30, 2020 (JP) ................................ 2020-182637

(51) Int. Cl.
*B41J 3/407* (2006.01)
*B41J 11/04* (2006.01)
(Continued)

(52) U.S. Cl.
CPC ............. *B41J 3/4075* (2013.01); *B41J 11/04* (2013.01); *B41J 11/14* (2013.01); *B41J 15/044* (2013.01)

(58) Field of Classification Search
None
See application file for complete search history.

(56) References Cited

U.S. PATENT DOCUMENTS 4,231,667 A 11/1980 Behrendt et al.
4,353,658 A 10/1982 Craft
(Continued)

FOREIGN PATENT DOCUMENTS

EP 0641663 A2 * 9/1994
JP 6021289 A * 2/1985
(Continued)

OTHER PUBLICATIONS

Translation of Ikeda et al. (Year: 1985).*
(Continued)

*Primary Examiner* — Matthew G Marini
(74) *Attorney, Agent, or Firm* — KENEALY VAIDYA LLP

(57) ABSTRACT

A printing device includes: a print head; a platen roller positioned to face the print head; a motor configured to generate a driving force to rotate the platen roller; a cassette receiving portion; and a power transmission portion configured to transmit the driving force of the motor to the platen roller. A cassette incorporating a printing tape to be printed by the print head is detachably attachable to the cassette receiving portion in a first direction. The power transmission portion includes a plurality of gears including a first gear movable from a first position to a second position downstream of the first position in the first direction. The power transmission portion is configured to switch a ratio of a rotation number of the platen roller to a rotation number of the motor depending on whether the first gear is at the first position or at the second position to transmit the driving force to the platen roller.

5 Claims, 17 Drawing Sheets

(51) Int. Cl.

| | |
|---|---|
| ***B41J 11/14*** | (2006.01) |
| ***B41J 15/04*** | (2006.01) |

(56) References Cited

U.S. PATENT DOCUMENTS

| | | | |
|---|---|---|---|
| 5,096,315 | A | 3/1992 | Yamamoto et al. |
| 2006/0233582 | A1 | 10/2006 | Horiuchi |

FOREIGN PATENT DOCUMENTS

| | | | | | |
|---|---|---|---|---|---|
| JP | H02-112462 | U | | 9/1990 | |
| JP | H06-336068 | A | | 12/1994 | |
| JP | 2002-370411 | A | | 12/2002 | |
| JP | 2009255307 | A | * | 11/2009 | ............ B41J 11/485 |
| WO | WO-2009084415 | A1 | * | 7/2009 | .............. B41J 11/04 |

OTHER PUBLICATIONS

The Final Office Action issued Apr. 19, 2024 to U.S. Appl. No. 17/511,309.

The extended European Search Report for the related European Patent Application No. 21204379.8 dated Mar. 2, 2022.

The Non-Final Office Action issued Oct. 12, 2023 to U.S. Appl. No. 17/511,309.

Japanese Office Action for the related Japanese Patent Application No. 2020-182641 dated May 14, 2024.

* cited by examiner

PRINTING DEVICE INCLUDING POWER TRANSMISSION MECHANISM CONFIGURED TO SWITCH ROTATION SPEED OF PLATEN ROLLER IN ASSOCIATION WITH ATTACHMENT OF CASSETTE

CROSS REFERENCE TO RELATED APPLICATION

This application claims priority from Japanese Patent Application No. 2020-182637 filed Oct. 30, 2020. The entire content of the priority application is incorporated herein by reference.

BACKGROUND

There has been known a printing device configured to perform printing on a printing tape that was accommodated in a cassette detachably attached to the printing device. For example, a prior art discloses such a conventional printing device that includes: a platen roller; a motor; a transmission mechanism configured to transmit a driving force of the motor to the platen roller; and a switching mechanism. The switching mechanism is configured to switch the power transmission path of the transmission mechanism in accordance with the rotational direction of the motor (forward or reverse) to thus change over a rotation speed of the platen roller. In this printing device, the rotational direction of the motor is controlled such that the rotation speed of the platen roller is to be lower for two-color printing than for monochromatic printing.

SUMMARY

However, in the above conventional printing device, an operation for origin confirmation of the motor is required each time the rotation speed of the motor is to be switched prior to start of printing. Hence, the timing to start printing is delayed by the period to perform the operation for origin confirmation.

In view of the foregoing, it is an object of the disclosure to provide a printing device that can start printing in a shorter period of time when performing switching of the rotation speed of the platen roller.

In order to attain the above and other objects, according to one aspect, the disclosure provides a printing device including a print head, a platen roller, a motor, a cassette receiving portion, and a power transmission portion. The platen roller is positioned to face the print head. The motor is configured to generate a driving force to rotate the platen roller. The cassette receiving portion is configured to detachably receive a cassette incorporating a printing tape to be printed by the print head. The cassette is attachable to the cassette receiving portion in a first direction. The power transmission portion is configured to transmit the driving force of the motor to the platen roller. The power transmission portion includes a plurality of gears including a first gear movable from a first position to a second position downstream of the first position in the first direction. The power transmission portion is configured to switch a ratio of a rotation number of the platen roller to a rotation number of the motor depending on whether the first gear is at the first position or at the second position to transmit the driving force to the platen roller.

With this structure, the rotation speed of the platen roller is made switchable by moving the first gear from the first position to the second position. Accordingly, the printing device is not required to perform an operation for origin confirmation in order to switch the rotation speed of the motor. The printing device can start printing in a shorter period of time when performing switching of the rotation speed of the platen roller.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

1. First Embodiment

A printing device 1 according to a first embodiment of the present disclosure will be described with reference to FIGS. 1A through 8.

Throughout the description, terms such as "front", "rear", "right", "left", "above", "below" will be used throughout the description based on an orientation of the printing device 1 illustrated in FIG. 1A. That is, a diagonal lower left side in FIG. 1A will be referred to as "left side", a diagonal upper right side in FIG. 1A will be referred to as "right side", a diagonal lower right side in FIG. 1A will be referred to as "front side", and a diagonal upper left side in FIG. 1A will be referred to as "rear side" of the printing device 1 (also see arrows illustrated in each drawing). Further, each component in the attached drawings is not to scale and illustrated as an example to facilitate understanding of the disclosure.

The printing device 1 according to the first embodiment is a tape printer of a universal type to which various types of cassettes such as a heat-sensitive type cassette, a receptor type cassette, and a laminate type cassette are each selectively attachable. The cassette of heat sensitive type includes a heat sensitive tape. The cassette of receptor type includes a printing tape, and an ink ribbon. The cassette of laminate type includes a double-sided adhesive tape, a film tape, and an ink ribbon.

The printing device 1 includes a print head 15 (FIG. 3) described later to perform printing on a printing medium. The printing medium to be printed by the print head 15 of the printing device 1 will be collectively referred to as "printing tape", hereinafter. That is, the printing tape may include: the heat-sensitive tape of the heat sensitive type cassette; the printing tape of the receptor type cassette; and the film tape of the laminate type cassette. For simplifying description, in the present embodiment, a cassette 6 of the heat-sensitive type is assumed to be attached to the printing device 1.

<Printing Device 1>

Figure 1A:
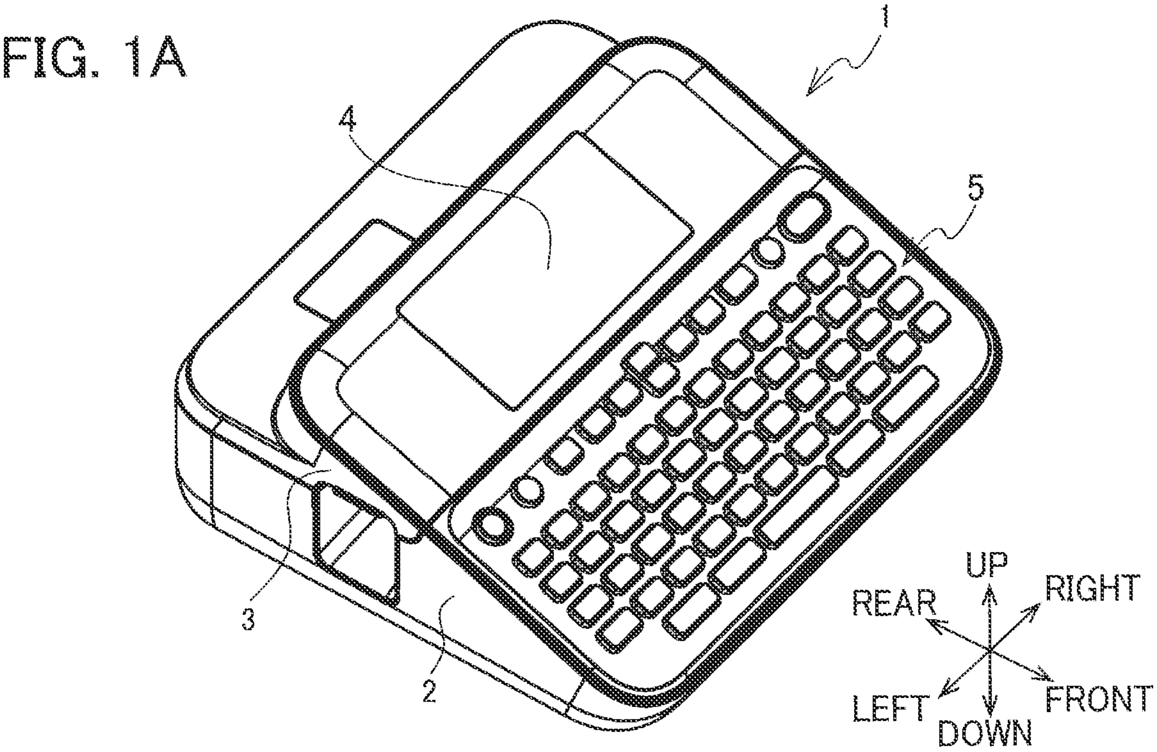
FIG. 1A is a perspective view of a printing device 1 according to a first embodiment of the disclosure in a state where a cover 3 thereof is closed.
Figure 1B:
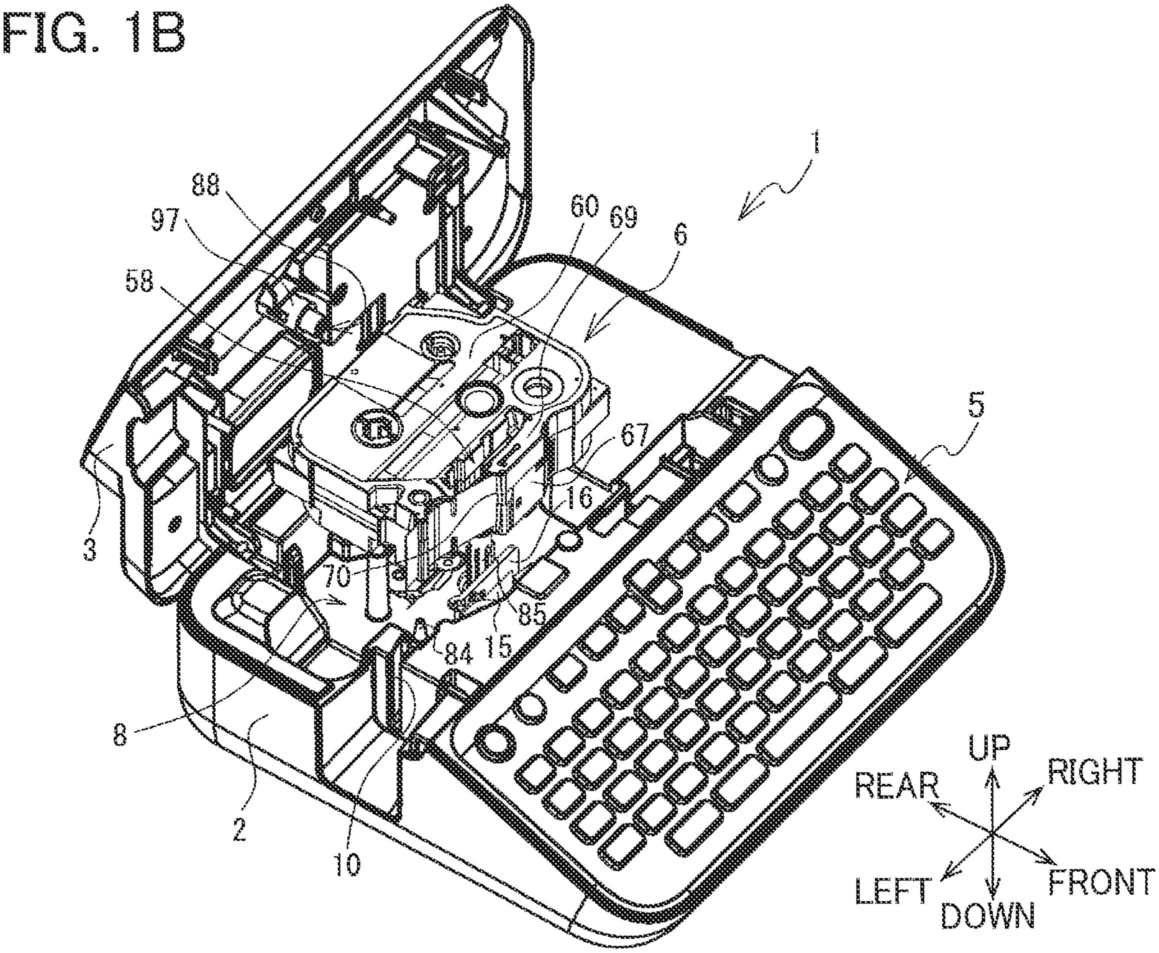
FIG. 1B is a perspective view of the printing device 1 according to the first embodiment in a state where the cover 3 is opened.

As illustrated in FIGS. 1A and 1B, the printing device 1 includes a housing 2, a cover 3, a display 4, and an operating portion 5.

The housing 2 has a generally rectangular parallelepiped shape. The housing 2 has a left side surface where an ejection slit 10 is formed. The ejection slit 10 is an opening extending in an upward/downward direction. The ejection slit 10 is configured to discharge therethrough a tape M (see FIG. 6) out of a cassette receiving portion 8 on which the cassette 6 is mounted.

The cover 3 is pivotally movably supported by a rear end portion of the housing 2 so as to be pivotable about an axis extending in a leftward/rightward direction. FIG. 1A illustrates a state where the cover 3 is closed relative to the housing 2, and FIG. 1B illustrates a state where the cover 3 is opened relative to the housing 2. The cover 3 is opened and closed, for example, when the cassette 6 is to be replaced with a new cassette. In the following description, description will be made assuming that the cover 3 is closed relative to the housing 2, i.e., based on the posture of the printing device 1 illustrated in FIG. 1A.

Figure 7:
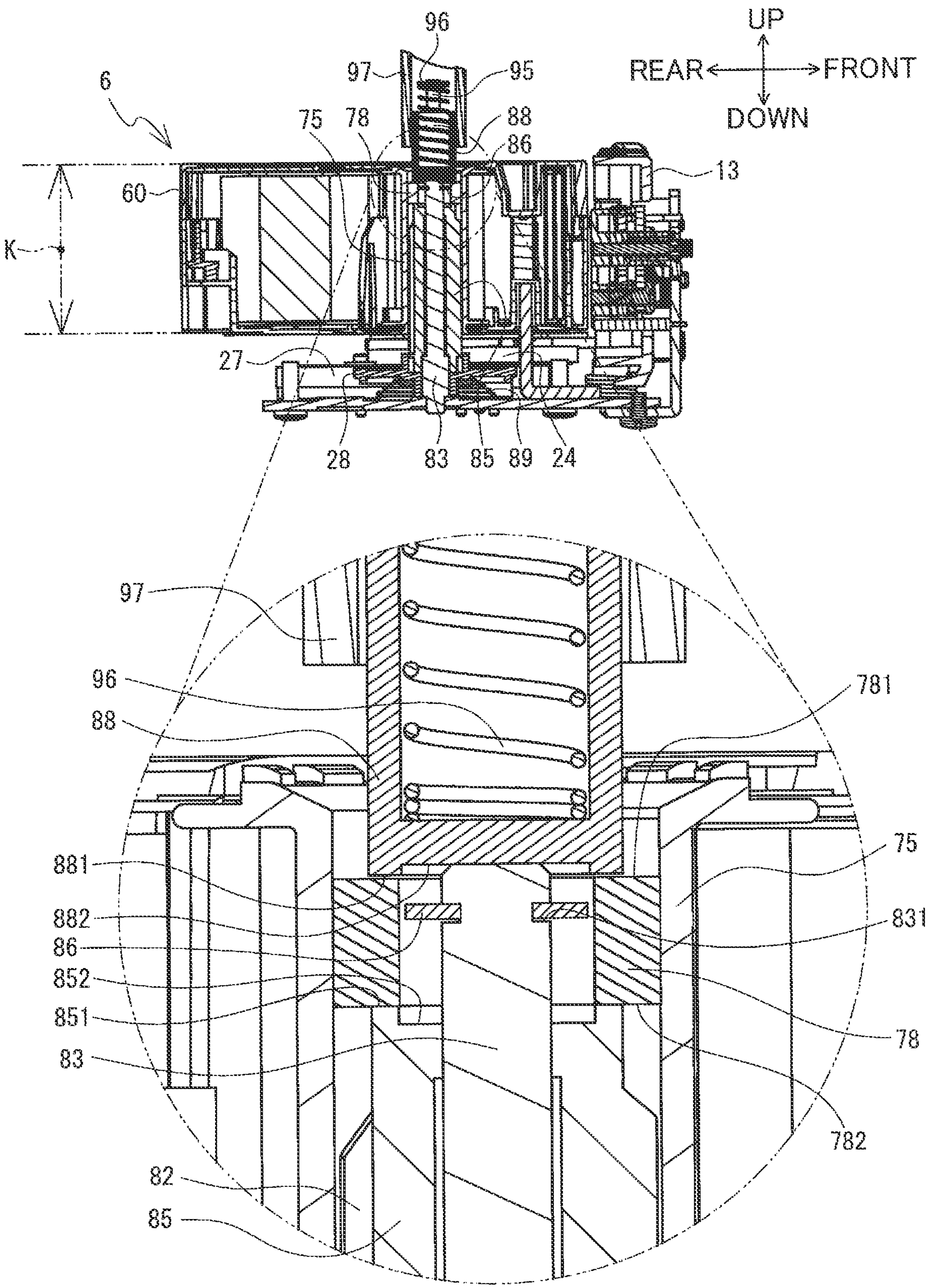
FIG. 7 is a cross-sectional view of the cassette 6 mounted on the cassette receiving portion 8 taken along a line VII-VI of FIG. 5, and particularly illustrating the cassette 6 including a pressure portion 78.

The cover 3 has a lower surface at which a pressure member 88, a support rod 95, an urging member 96, and a sleeve portion 97 are provided (see FIGS. 1B and 7). The pressure member 88 is hollow cylindrical in shape with a closed bottom and extends in the upward/downward direction. The pressure member 88 is configured to press the cassette 6 downward in a state where the cassette 6 is attached to the cassette receiving portion 8. The pressure member 88 has an upper end portion connected to the support rod 95.

The urging member 96 such as a coil spring is disposed over the support rod 95 and inside the hollow space of the pressure member 88. Specifically, the urging member 96 has an upper end connected to an upper end of the support rod 95. The urging member 96 (more specifically, a lower end of the urging member 96) is in abutment with the pressure member 88 to urge the pressure member 88 downward. The sleeve portion 97 is hollow cylindrical in shape and extends in the upward/downward direction. The upper end portion of the pressure member 88 is inserted in the hollow space of the sleeve portion 97, such that the sleeve portion 97 guides movement of the pressure member 88 in the upward/downward direction.

Although not illustrated in the drawings, the pressure member 88 has an upper rear outer peripheral portion provided with a protrusion, and the sleeve portion 97 is formed with a groove (not illustrated) extending in the upward/downward direction. The protrusion of the pressure member 88 is engaged with the groove of the sleeve portion 97, thereby regulating a movable range of the pressure member 88 in the upward/downward direction.

As illustrated in FIG. 1A, the display 4 is provided on an upper surface of the cover 3. The display 4 is, for example, a liquid crystal display configured to display various information. The operating portion 5 is provided on an upper surface of the housing 2 and is positioned frontward of the cover 3. The operating portion 5 is configured to be operated by a user to input various instructions.

Figure 2:
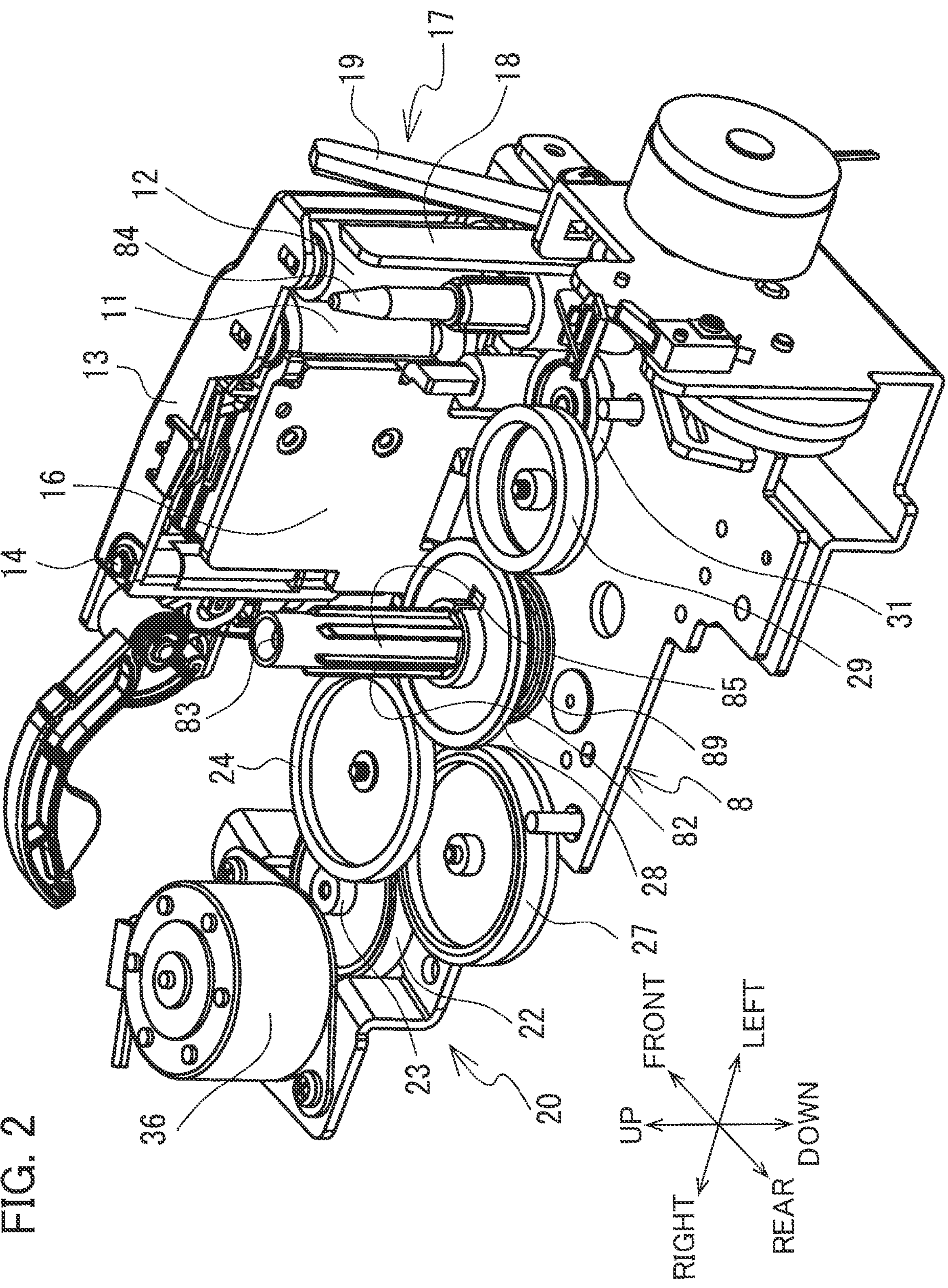
FIG. 2 is a perspective view illustrating a cassette receiving portion 8, a motor 36, and a power transmission portion 20 in the printing device 1 according to the first embodiment, in which delineation of a bottom surface of the cassette receiving portion 8 is omitted.
Figure 3:
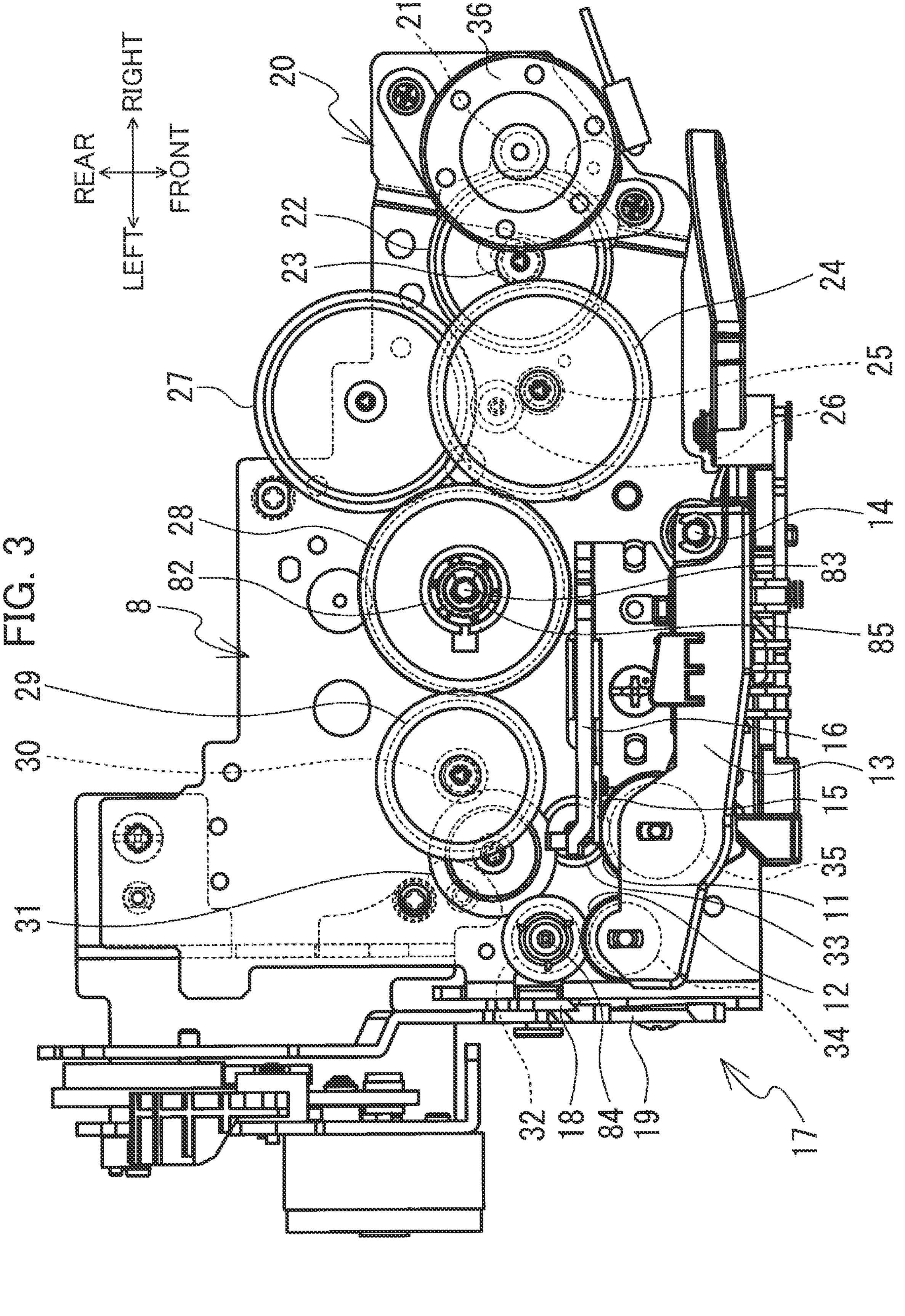
FIG. 3 is a plan view illustrating the cassette receiving portion 8, the motor 36, and the power transmission portion 20 in the printing device 1 according to the first embodiment.
Figure 4:
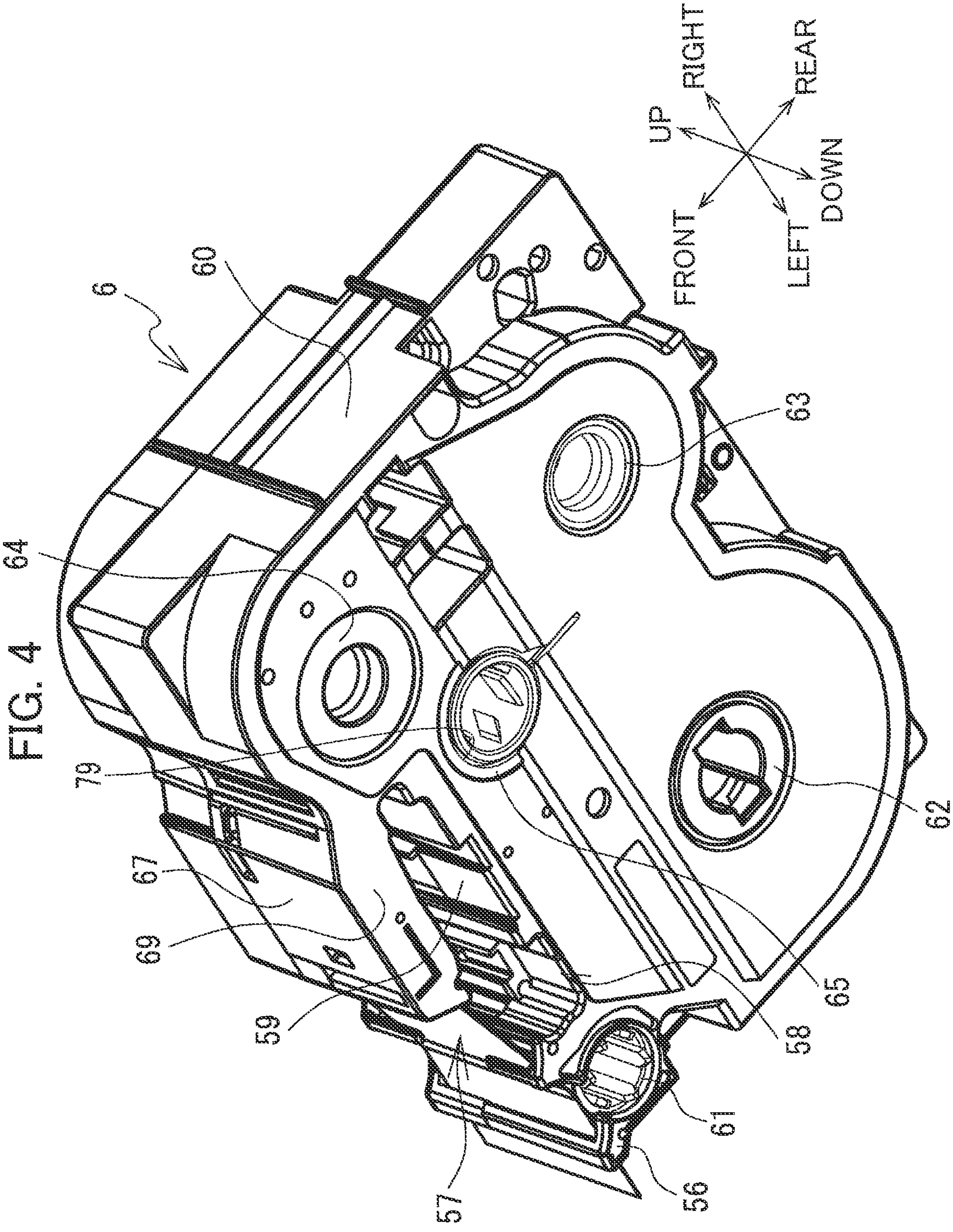
FIG. 4 is a perspective view of a cassette 6 to be used with the printing device 1 according to the first embodiment.

As illustrated in FIGS. 1B, 2 and 3, the printing device 1 includes the cassette receiving portion 8, drive shafts 83, 84, a movable member 85, a head holder 16, the print head 15, a platen holder 13, a platen roller 11, a movable conveyer roller 12, a motor 36, a power transmission portion 20, an urging member 89, and a cutter mechanism 17. All these parts are provided in a space surrounded by the housing 2 and the closed cover 3.

The cassette receiving portion 8 is in a recessed form recessed downward for detachably receiving the cassette 6 thereon. The cassette 6 is of the heat sensitive type and thus accommodates therein a heat-sensitive tape 51 (FIG. 6) as the printing tape to be printed by the print head 15. The drive shafts 83, 84 and the movable member 85 are provided at the cassette receiving portion 8.

The drive shafts 83 and 84 respectively extend in the upward/downward direction. The drive shaft 83 is positioned rearward of a right end portion of the head holder 16, and the drive shaft 84 is positioned leftward of the head holder 16. To the drive shaft 83, a first gear 28 (described later) of the power transmission portion 20 is coupled coaxially, so that the drive shaft 83 is rotatable in accordance with the rotation of the first gear 28.

The movable member 85 is provided at the cassette receiving portion 8, and is movable in the upward/downward direction with respect to the drive shaft 83. Specifically, the movable member 85 is disposed over the drive shaft 83 so as to be movable in the upward/downward direction relative to the drive shaft 83. The movable member 85 is disposed over the drive shaft 83 at a position above the first gear 28 provided adjacent to a lower end of the drive shaft 83. The movable member 85 has a lower end in abutment with an upper surface of the first gear 28.

A plurality of ribs 82 is provided on outer peripheral surface of the movable member 85. The ribs 82 are arranged radially about an axis of the movable member 85 extending in the upward/downward direction with an equal interval between neighboring ribs. The plurality of ribs 82 protrude radially outwardly from the outer peripheral surface of the movable member 85, and extend downward from a position adjacent to the upper end of the movable member 85. The movable member 85 is configured to be rotated by the rotation of the drive shaft 83.

The urging member 89 is disposed over the drive shaft 83 at a position below the first gear 28. The urging member 89 urges the first gear 28 upward. The movable member 85 is urged upward by the urging member 89 through the first gear 28.

As illustrated in FIG. 7, an upper end portion of the drive shaft 83 is formed with an annular groove 831 recessed toward the axis of the drive shaft 83, and a ring 86 is fitted in the annular groove 831. The ring 86 has an outer peripheral surface positioned further radially outwardly relative to the outer peripheral surface of the drive shaft 83. The movable member 85 has an upper end 851 formed with an annular recessed portion 852 recessed downward. The ring 86 protruding radially outward from the drive shaft 83 is configured to come into contact with the annular recessed portion 852, thereby restricting further upward movement of the movable member 85.

The drive shaft 84 is coaxial with a gear 32 (described later, FIG. 3) of the power transmission portion 20, and is rotatable by the rotation of the gear 32. Upon attachment of the cassette 6 to the cassette receiving portion 8, the drive shaft 83 is inserted in a spool 75 (described later, FIG. 6) of the cassette 6 to rotate the spool 75 in accordance with rotations of the motor 36; and the drive shaft 84 is inserted in a tape conveyer roller 71 (described later, FIG. 6) of the cassette 6 to rotate the tape conveyer roller 71 in accordance with the rotations of the motor 36.

The first gear 28, the movable member 85, and the urging member 89 are disposed over the drive shaft 83. The first gear 28 and the urging member 89 are arranged below a bottom wall (not illustrated) of the cassette receiving portion 8. The bottom wall is formed with two circular holes in a plan view. The drive shaft 83 and the movable member 85 disposed thereover are inserted through one of the circular holes. The drive shaft 84 is inserted through the other one of the circular holes.

The head holder 16 is positioned at a front portion of the cassette receiving portion 8. The head holder 16 is plate shaped and made from metal. The head holder 16 has a front surface equipped with the print head 15. The print head 15 includes a plurality of heat generating elements configured to heat the heat-sensitive tape 51 provided in the cassette 6 for printing. The head holder 16 is inserted in a head opening 58 (described later, FIG. 6) of the cassette 6 upon attachment of the cassette 6 to the cassette receiving portion 8.

Incidentally, in a case where the cassette 6 is either of the receptor type or the laminate type, the plurality of heat generating elements of the print head 15 is configured to heat the ink ribbon provided in the cassette 6 for printing. The rotation of the drive shaft 83 is used for winding the ink ribbon after printing by the print head 15.

The motor 36 is positioned rightward of the cassette receiving portion 8. The motor 36 includes a motor body and an output shaft extending downward from the motor body. A stepping motor is one example of the motor 36.

The power transmission portion 20 includes a plurality of gears 21 through 35 including the first gear 28 and the gears 31, 32 described above. The power transmission portion 20 illustrated in FIGS. 2 and 3 are hidden from sight with the bottom wall of the cassette receiving portion 8. In FIGS. 2, 3 and 7, delineation of gear teeth of the gears 21-35 is omitted.

The first gear 28 is movable from a first position to a second position lower than the first position. Specifically, the first gear 28 is movable from the first position to the second position in interlocking relation to the downward movement of the movable member 85. The power transmission portion 20 is configured to changeover a ratio of the rotation number of the platen roller 11 to the rotation number of the motor 36 dependent on whether the first gear 28 is at the first position or the second position when transmitting the driving force of the motor 36 to the platen roller 11.

More specifically, in the power transmission portion 20, the gear 21 is fixed to a lower end portion of the output shaft of the motor 36. The gear 21 is in meshing engagement with a gear 22 positioned leftward of the gear 21. The gear 22 is coaxial with a gear 23 constituting a cluster gear in combination of the gear 22. The gear 23 has a diameter smaller than that of the gear 22, and has gear teeth whose number is smaller than that of the gear 22. The gear 23 is positioned above the gear 22.

The gear 23 is in meshing engagement with a second gear 24 positioned leftward of the gear 23. The second gear 24 is coaxial with a gear 25 constituting a cluster gear in combination of the second gear 24. The gear 25 has a diameter smaller than that of the second gear 24, and has gear teeth whose number is smaller than that of the second gear 24. The gear 25 is positioned below the second gear 24. The gear 25 is in meshing engagement with a gear 26 positioned diagonally leftward and rearward of the gear 25. The gear 26 has a diameter slightly greater than a diameter of the gear 25.

The gear 26 is in meshing engagement with a third gear 27 positioned rearward of the gear 26. The third gear 27 has a diameter greater than the diameter of the gear 26. The third gear 27 has a front end portion positioned below a rear end portion of the second gear 24. That is, the front end portion of the third gear 27 and the rear end portion of the second gear 24 are overlapped with each other in the upward/downward direction.

The first gear 28 is configured to be meshingly engaged with the second gear 24 when the first gear 28 is at the first position, while the first gear 28 is configured to be meshingly engaged with the third gear 27 when the first gear 28 is at the second position. The first gear 28 is meshingly engaged with a gear 29 positioned leftward of the first gear 28, regardless of whether the first gear 28 is at the first position or the second position. As one example, a rotation ratio of the first gear 28 at the second position is one fifth of the rotation ratio of the first gear 28 at the first position. Incidentally, the rotation ratio of the motor 36 to the platen roller 11 when the first gear 28 is at the first position and the second position may be appropriately altered.

The gear 29 is coaxial with a gear 30 constituting a cluster gear in combination of the gear 29. The gear 30 has a diameter smaller than that of the gear 29, and has gear teeth whose number is smaller than that of the gear 29. The gear 30 is positioned below the gear 29. The gear 30 is in meshing engagement with the gear 31 positioned diagonally leftward and frontward of the gear 30. The gear 31 is in meshing engagement with the gear 32 positioned diagonally leftward and frontward of the gear 31.

The gear 32 is configured to be meshingly engaged with the gear 34 positioned frontward of the gear 32 when the platen holder 13 is at a printing position described later. The gear 31 is also in meshing engagement with the gear 33 positioned diagonally rightward and frontward of the gear 31. The gear 33 is configured to be meshingly engaged with the gear 35 positioned frontward of the gear 33 when the platen holder 13 is at the printing position.

In the state where the cassette 6 is attached to the cassette receiving portion 8, the rotation of the motor 36 in a counterclockwise direction causes a rotation of the drive shaft 83 in the counterclockwise direction in a plan view. The rotation of the drive shaft 83 rotates the spool 75 attached to the drive shaft 83. The rotation of the motor 36 is transmitted to the drive shaft 84 to rotate the tape conveyer roller 71 attached to the drive shaft 84 in a clockwise direction in a plan view. The rotation of the motor 36 is also transmitted to the gears 34 and 35 to rotate the movable conveyer roller 12 and the platen roller 11, respectively, in the counterclockwise direction in a plan view.

The platen holder 13 has an arm-like shape, and is positioned frontward of the head holder 16. The platen holder 13 is pivotally movable about an axis of a shaft 14 extending in the upward/downward direction and provided at a right end portion of the platen holder 13. The platen roller 11 and the movable conveyer roller 12 are supported at a left end portion of the platen holder 13 such that the platen roller 11 and movable conveyer roller 12 are rotatable about axes extending in the upward/downward direction.

Specifically, the platen holder 13 is pivotally movable between a standby position (illustrated by phantom lines in FIG. 6) and the printing position (illustrated by solid lines in FIG. 6) in interlocking relation to the opening/closing movement of the cover 3. The platen holder 13 at the printing position is positioned adjacent to the cassette receiving portion 8. The platen holder 13 at the standby position is positioned apart from the cassette receiving portion 8. The platen holder 13 is moved from the printing position to the standby position in association with the opening movement of the cover 3. The cassette 6 is attachable to and detachable from the cassette receiving portion 8 by a user when the platen holder 13 is at the standby position.

At the printing position of the platen holder 13, the platen roller 11 faces the print head 15 and in contact therewith. The platen roller 11 is thus configured to make contact with and separate from the print head 15 in accordance with the pivotal movement of the platen holder 13. Likewise, the movable conveyer roller 12 faces the tape conveyer roller 71 attached to the drive shaft 84 when the platen holder 13 is at the printing position. The movable conveyer roller 12 is configured to make contact with and separate from the tape conveyer roller 71 attached to the drive shaft 84 in accordance with the pivotal movement of the platen holder 13.

The platen holder 13 is moved from the standby position to the printing position in association with the closing movement of the cover 3. In the attached state of the cassette 6 to the cassette receiving portion 8 (and hence when the platen holder 13 is at the printing position), the platen roller 11 is pressed against the print head 15 through the printing tape (heat-sensitive tape 51), and the movable conveyer roller 12 is pressed against the tape conveyer roller 71 through the printing tape (heat-sensitive tape 51) and an adhesive tape 52 (described later) of the cassette 6.

Further, when the platen holder 13 is at the printing position, the gear 32 is meshingly engaged with the gear 34, and the gear 33 is meshingly engaged with the gear 35. Hence, the platen roller 11 and the movable conveyer roller 12 are respectively rotated by the rotation of the motor 36. A rotation speed of the platen roller 11 is switchable depending on the upward/downward direction position (first position or second position) of the first gear 28 of the power transmission portion 20. The printing device 1 can perform printing using the cassette 6 attached to the cassette receiving portion 8 when the platen holder 13 is at the printing position.

The cutter mechanism 17 is positioned leftward of the cassette receiving portion 8 and rightward of the ejection slit 10. The cutter mechanism 17 is configured to cut the tape M (see FIG. 6) discharged out of the cassette 6 attached to the cassette receiving portion 8 at a predetermined position. The cutter mechanism 17 includes a fixed blade 18 and a movable blade 19 those made from metal. The movable blade 19 is positioned to face the fixed blade 18, and is movable relative to the fixed blade 18.

<Cassette 6>

The cassette 6 will next be described with reference to FIGS. 4 through 8.

The cassette 6 includes a casing 60. Depending on the kinds of the printing tape accommodated in the casing 60, the cassette 6 can be one of: a heat-sensitive type cassette, a laminate type cassette, and a receptor type cassette. In other words, the cassette 6 is of universal type. In the first embodiment, the cassette 6 of the heat-sensitive type is described as an example of a cassette of the disclosure.

In addition to the casing 60, the cassette 6 further includes support portions 61-65, the tape conveyer roller 71, spools

71-75, the heat-sensitive tape 51, and the adhesive tape 52. In a case where the heat-sensitive tape 51 is of a color heat-sensitive type to be used for color printing, the cassette 6 further includes a pressure portion 78 (FIG. 7). On the other hand, in a case where the heat-sensitive tape 51 is of a monochromatic heat-sensitive type to be used for monochromatic printing, the pressure portion 78 is not provided.

The casing 60 has a generally rectangular parallelepiped shape (or a box-like shape) with rounded corners in a plan view. The casing 60 includes an arm portion 69, an ejection opening 70, a head peripheral wall 59, and a guide portion 56.

The arm portion 69 extends leftward from a right front portion of the casing 60. The arm portion 69 is defined by an arm front wall 67 and an arm rear wall 68. The arm front wall 67 constitutes a part of a front wall of the casing 60. The arm front wall 67 extends in the upward/downward direction and in the leftward/rightward direction across a left-right center of the front wall of the casing 60. The arm rear wall 68 is positioned rearward of the arm front wall 67 to be spaced away therefrom. The arm rear wall 68 extends in the leftward/rightward direction and the upward/downward direction.

The ejection opening 70 is formed at a left end portion of the arm portion 69. The ejection opening 70 is a slit extending in the upward/downward direction and positioned between the arm front wall 67 and the arm rear wall 68 in the frontward/rearward direction.

The head peripheral wall 59 extends rearward from a right end of the arm rear wall 68 and then extends leftward in parallel to the arm rear wall 68. The head peripheral wall 59 and the arm rear wall 68 define the head opening 58 therebetween. That is, the head opening 58 is positioned rearward of and adjacent to the arm portion 69. The head opening 58 has a substantially rectangular shape in a plan view and extends throughout a thickness of the casing 60 in the upward/downward direction. The head opening 58 also extends in the leftward/rightward direction across a left-right center of the casing 60.

Upon attachment of the cassette 6 to the cassette receiving portion 8 of the printing device 1, the head holder 16 of the cassette receiving portion 8 is inserted in the head opening 58. The head opening 58 is communicated with an outside of the cassette 6 at a front side thereof through an open portion 57 (see FIG. 4) formed in the front wall of the casing 60. The heat-sensitive tape 51 accommodated in the casing 60 is ejected out of the arm portion 69 through the ejection opening 70, and is exposed to the outside at the open portion 57 where the print head 15 performs printing on the heat-sensitive tape 51.

The guide portion 56 is positioned at a left front corner of the casing 60. The guide portion 56 is configured to guide the tape M (the printed heat-sensitive tape 51 on which the adhesive tape 52 is superposed) toward the cutter mechanism 17, while the tape M passes through the guide portion 56.

The support portion 61 is positioned at a left front end portion of the casing 60 and rotatably supports the tape conveyer roller 71. The support portion 62 is positioned at a left rear end portion of the casing 60 and rotatably supports the spool 72. The support portion 63 is positioned at a right rear end portion of the casing 60 and rotatably supports the spool 73. The support portion 64 is positioned at a right front end portion of the casing 60 and rotatably supports the spool 74. The support portion 65 is positioned between the support portion 61 and the support portion 64 in the leftward/rightward direction. The support portion 65 is positioned forward of the support portions 63 and 64 and rearward of the support portions 61 and 64. The support portion 65 rotatably supports the spool 75.

Figure 6:
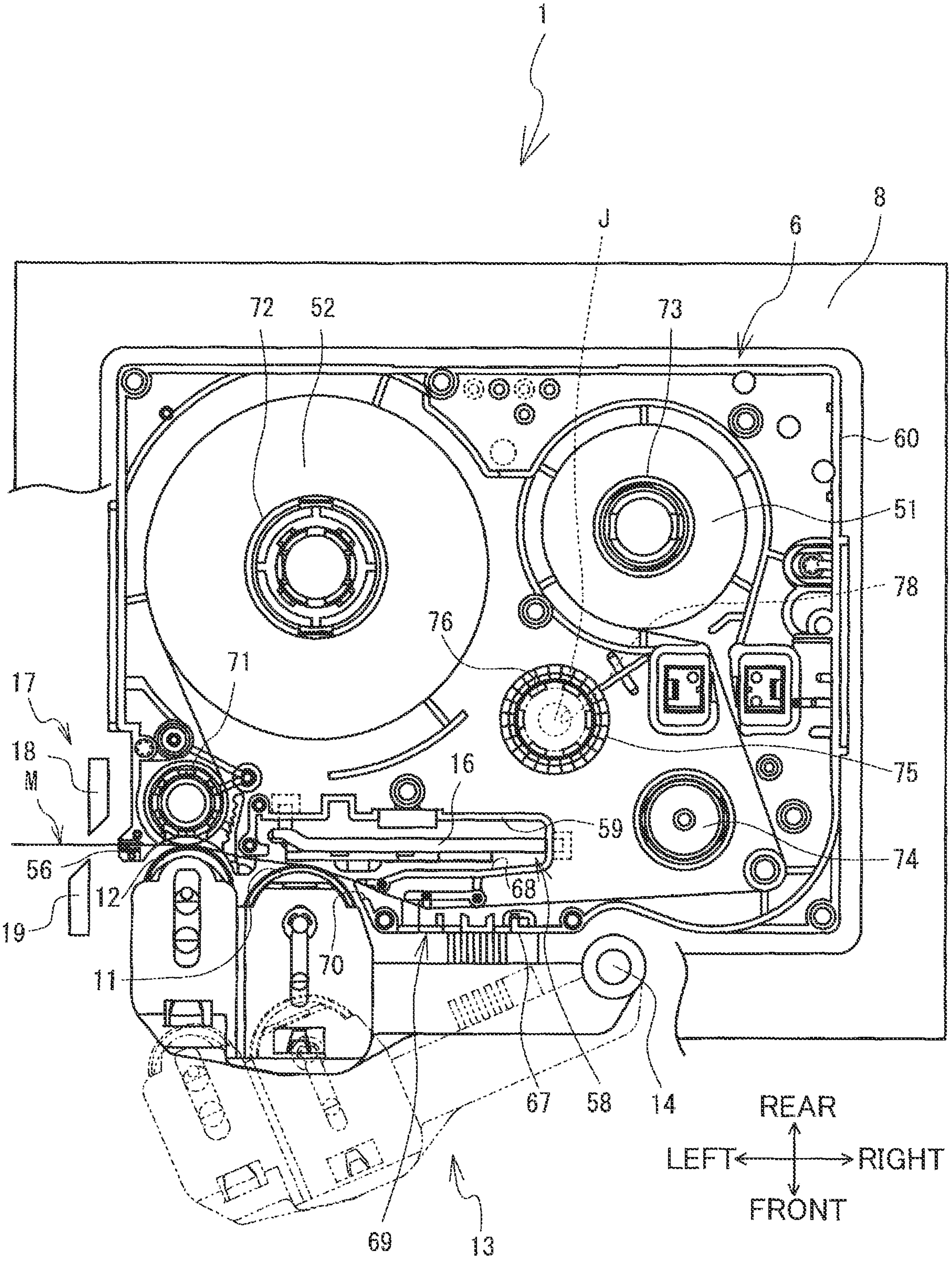
FIG. 6 is a schematic plan view illustrating an internal structure of the cassette 6 that is mounted on the cassette receiving portion 8.

The spool 75 is rotatably supported by the support portion 65 extending throughout the thickness of the casing 60 in the upward/downward direction. The spool 75 has an inner peripheral surface defining a hollow space of the spool 75, the hollow space being in alignment with an opening 79 formed in a lower wall of the casing 60 (see FIG. 4). Referring to FIG. 6, the inner peripheral surface of the spool 75 is provided with engagement parts 76 protruding radially inwardly therefrom. The engagement parts 76 extend in the upward/downward direction to occupy at least a region below a center K in the upward/downward direction of the inner peripheral surface of the spool 75 (see FIG. 7). The engagement parts 76 are engageable with the ribs 82 of the movable member 85 which is rotatable (together with the drive shaft 83) by the rotation of the motor 36. Hence, the spool 75 is rotatable in association with the rotation of the movable member 85.

As illustrated in FIG. 6, the heat-sensitive tape 51 is an elongated-shaped printing medium (printing tape).

In a case where the heat-sensitive tape 51 is a printing tape of the color heat-sensitive type, the heat-sensitive tape 51 is constituted by lamination of multiple layers for enabling color printing using a combination of three primary colors of cyan, magenta and yellow.

Specifically, the heat-sensitive tape 51 of the color heat-sensitive type includes, for example, a base layer, a plurality of heat-sensitive layers, a plurality of heat-insulating layers, and an overcoat layer. According to the present embodiment, the plurality of heat-sensitive layers includes a first heat-sensitive layer, a second heat-sensitive layer, and a third heat-sensitive layer. The plurality of heat-insulating layers includes a first heat-insulating layer and a second heat-insulating layer. The base layer, the first heat-sensitive layer, the first heat-insulating layer, the second heat-sensitive layer, the second heat-insulating layer, the third heat-sensitive layer, and the overcoat layer are laminated in the order given in a thickness direction of the heat-sensitive tape 51.

The base layer is a resin film, specifically a non-foamed resin film. Each of the first heat-sensitive layer, the second heat-sensitive layer, and the third heat-sensitive layer is configured to produce a color corresponding to one of the three primary colors (cyan, magenta, and yellow) when heated to a color-developing temperature specific to that layer. The first heat-insulating layer and the second heat-insulating layer are sheet-like layers each made from a material having relatively low thermal conductivity. Each of the heat-insulating layers produces a desired difference in temperature between the neighboring heat-sensitive layers according to the thermal conductivity of each heat-insulating layer. The overcoat layer is positioned opposite to the base layer to protect the plurality of heat-sensitive layers.

In a case where the heat-sensitive tape 51 is a printing tape of the monochromatic heat-sensitive type, the heat-sensitive tape 51 is constituted by lamination of multiple layers for enabling monochromatic printing. Specifically, the heat-sensitive tape 51 includes, for example, a base layer, a heat-sensitive layer, and an overcoat layer. The base layer, heat-sensitive layer, and overcoat layer are laminated in the order given in the thickness direction of the heat-sensitive tape 51.

The heat-sensitive tape 51 of either the color heat-sensitive type or the monochromatic heat-sensitive type is wound over the spool 73 in a roll-like form, and is paid out frontward from a front end of the roll, and is then turned leftward at a front right end portion of the cassette 6. The heat-sensitive tape 51 passes through an interior of the arm portion 69, and is exposed to the outside of the cassette 6 through the ejection opening 70.

Upon attachment of the cassette 6 to the cassette receiving portion 8, in the head opening 58, the base layer of the heat-sensitive tape 51 faces the platen roller 11, and the overcoat layer, which is opposite to the base layer, faces the print head 15. After passing through the head opening 58, the heat-sensitive tape 51 passes through a portion between the tape conveyer roller 71 and the movable conveyer roller 12. At this time, the overcoat layer of the heat-sensitive tape 51 faces the tape conveyer roller 71, while the base layer of the heat-sensitive tape 51 faces the movable conveyer roller 12.

The adhesive tape 52 is an elongated medium, and is constituted by lamination of multiple layers. Specifically, the adhesive tape 52 includes a double-sided adhesive tape, and a release paper. The double-sided adhesive tape includes a white sheet, is configured by applying adhesive agent to each surface of the white sheet.

The adhesive tape 52 is wound over the spool 72 in a roll-like form, and is paid out frontward from a left end of the roll. The adhesive tape 52 is then turned leftward, while making contact with a right front peripheral portion of the tape conveyer roller 71. At this time, the releasable paper of the adhesive tape 52 faces the tape conveyer roller 71, and the double-sided adhesive tape of the adhesive tape 52 faces the movable conveyer roller 12. The heat-sensitive tape 51 is superposed with the adhesive tape 52 such that the overcoat layer contacts the adhesive tape 52.

Further, in the case where the cassette 6 accommodates the heat-sensitive tape 51 of the color heat-sensitive type, the cassette 6 also includes the pressure portion 78.

The pressure portion 78 is a cylindrical protruding portion protruding, from the inner peripheral surface of the spool 75, radially inward toward a center axis J of the spool 75 (see FIG. 6). The pressure portion 78 is positioned above the center K in the upward/downward direction of the inner peripheral surface of the spool 75 (see FIG. 7). That is, the pressure portion 78 is positioned closer to an upper wall of the casing 60 than to the bottom wall of the casing 60 in the upward/downward direction. The pressure portion 78 has a protruding length greater than a protruding length of the engagement parts 76 on the inner peripheral surface of the spool 75, as illustrated in FIG. 6. The pressure portion 78 protrudes radially inward to a position closest to the center axis J among any other portions provided on the inner peripheral surface of the spool 75. The pressure portion 78 may be or may not be integrally formed with the spool 75.

The pressure portion 78 is configured to contact the first gear 28 indirectly (via the movable member 85) upon attachment of the cassette 6 (casing 60) to the cassette receiving portion 8. In the present embodiment, the pressure portion 78 is configured to contact the movable member 85 from above to push the same downward upon attachment of the cassette 6 to the cassette receiving portion 8, thereby moving the first gear 28 downward from the first position to the second position. Hence, the ratio of the rotation number of the platen roller 11 to the rotation number of the motor 36 is switched upon transmission of the driving force of the motor 36 to the platen roller 11.

<Attachment and Detachment of Cassette 6 Relative to Cassette Receiving Portion 8>

Next, attachment of the cassette 6 including the pressure portion 78 to the cassette receiving portion 8 and attachment of the cassette 6 without the pressure portion 78 to the cassette receiving portion 8 will be respectively described with reference to FIGS. 1A, 1B, 5, 7, and 8. The cassette 6 with the pressure portion 78 includes the heat-sensitive tape 51 of color heat-sensitive type, whereas the cassette 6 without the pressure portion 78 includes the heat-sensitive tape 51 of monochromatic heat-sensitive type, as described above.

Figure 5:
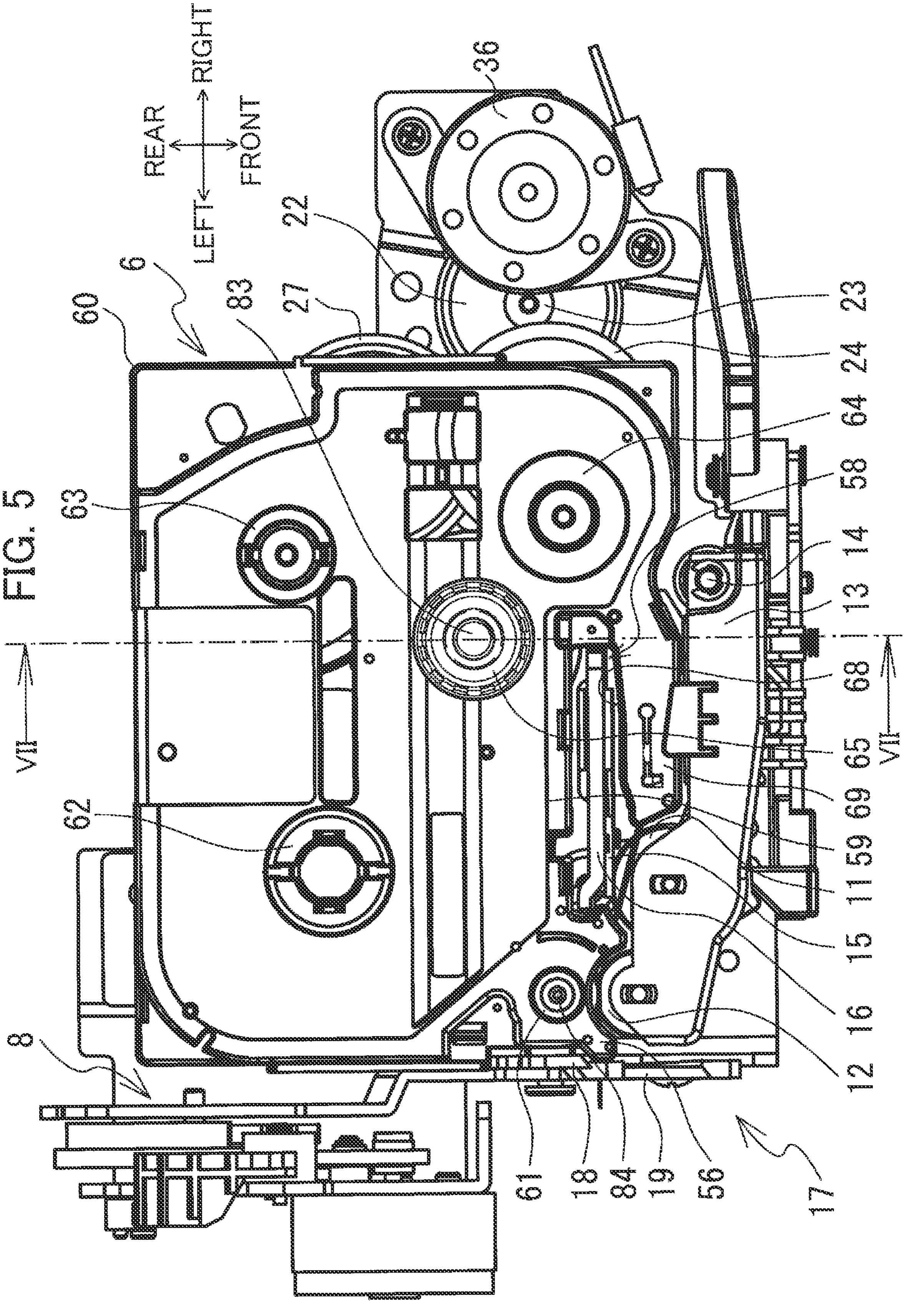
FIG. 5 is a plan view illustrating the cassette receiving portion 8 on which the cassette 6 is mounted, in which delineation of the bottom surface of the cassette receiving portion 8 is omitted.

As illustrated in FIG. 1B, for attaching the cassette 6 (with and without the pressure portion 78) to the cassette receiving portion 8, a user holds the cassette 6 above the cassette receiving portion 8 while the cover 3 remains open relative to the housing 2. The user then moves the cassette 6 downward toward the cassette receiving portion 8. In so doing, as illustrated in FIG. 5, the drive shaft 83 is inserted into the spool 75 of the cassette 6, and the drive shaft 84 is inserted into the tape conveyer roller 71 of the cassette 6, and the head holder 16 is inserted into the head opening 58. The cassette 6 (with and without the pressure portion 78) is thus attached to the cassette receiving portion 8. In the present embedment, the downward direction is an attaching direction of the cassette 6 in the present embodiment. The user than closes the cover 3 relative to the housing 2, as illustrated in FIG. 1A.

As illustrated in FIG. 7, in a case where the cassette 6 including the pressure portion 78 is attached to the cassette receiving portion 8, the drive shaft 83 rotatable by the rotation of the motor 36 is inserted in the spool 75 to extend therethrough. By the downward movement of the cassette 6, the pressure portion 78 pushes the first gear 28 downward through the movable member 85 disposed over the drive shaft 83.

Specifically, the pressure portion 78 has an upper end face 781 and a lower end face 782. The pressure member 88 provided at the lower surface of the cover 3 has a lower end 881 configured to face the upper end face 781 of the pressure portion 78. The lower end 881 of the pressure member 88 is formed with a recess 882 that is recessed upward. The upper end of the drive shaft 83 is configured to abut on the recess 882. The lower end face 782 of the pressure portion 78 is configured to contact the upper end 851 of the movable member 85.

By the insertion of the cassette 6 in the cassette receiving portion 8, the lower end face 782 of the pressure portion 78 is brought into abutment with the upper end 851 of the movable member 85 to push the movable member 85 and the first gear 28 downward against the biasing force of the urging member 89. As a result, the first gear 28 is moved downward from the first position to the second position, so that the first gear 28 is disengaged from the second gear 24 and is brought into meshing engagement with the third gear 27. At this time, the upper end face 781 of the pressure portion 78 is slightly spaced away from the lower end 881 of the pressure member 88. Further, the upper end of the drive shaft 83 abuts on the recess 882 of the pressure member 88, and is pressed downward by the pressure member 88 when the cover 3 is closed. With this structure, even if the attached cassette 6 is lifted upward by the urging force of the urging member 89, the pressure portion 78 is brought into contact with the pressure member 88 so that the attached cassette 6 can be restricted from moving further upward.

For detaching the cassette 6 provided with the pressure portion 78 from the cassette receiving portion 8, the user takes out the cassette 6 by moving the cassette 6 upward (in a cassette detaching direction) while the cover 3 is opened. As the pressure portion 78 separates from the movable member 85 in accordance with the detachment of the cassette 6, the first gear 28 is moved upward from the second position to the first position by the urging force of the urging member 89. Accordingly, the first gear 28 is disengaged from the third gear 27 and is brought into meshing engagement with the second gear 24.

Figure 8:
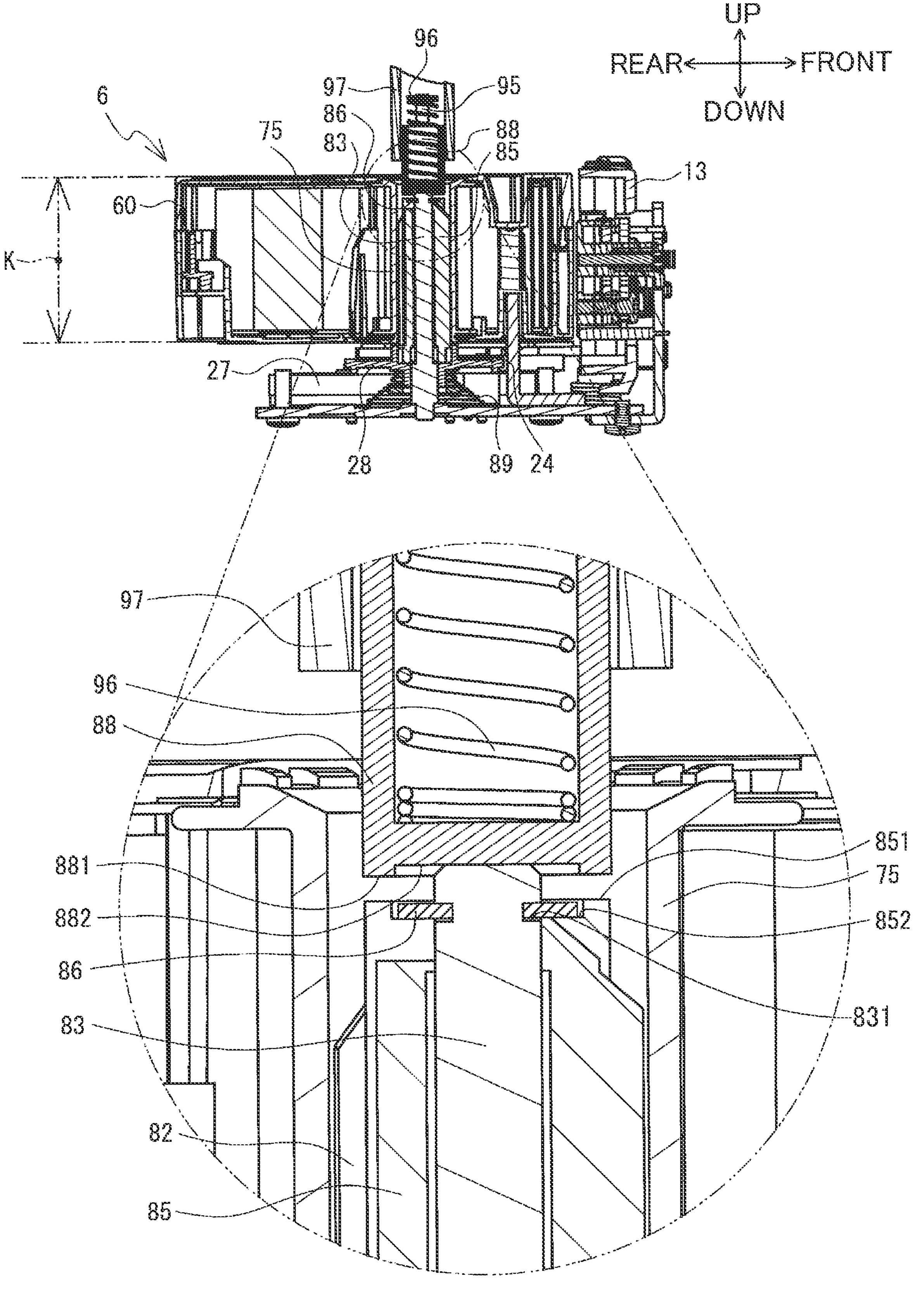
FIG. 8 is a cross-sectional view of the cassette 6 mounted on the cassette receiving portion 8 taken along the line VII-VII of FIG. 5, and particularly illustrating the cassette 6 without the pressure portion 78.

In a case where the cassette 6 without the pressure portion 78 is attached to the cassette receiving portion 8 as illustrated in FIG. 8, the drive shaft 83 is inserted in the hollow space of the spool 75 to extend therethrough.

Specifically, the recessed portion 852 of the movable member 85 abuts on the lower surface of the ring 86 provided at the upper end portion of the drive shaft 83. Due to the abutment of the movable member 85 with the ring 86 of the drive shaft 83, the movable member 85 is restricted from moving further upward by the urging force of the urging member 89. Accordingly, the first gear 28 remains at the first position to engage the second gear 24. Further, the upper end of the drive shaft 83 abuts on the recess 882 of the pressure member 88. With this structure, even if the attached cassette 6 without the pressure portion 78 is lifted upward by the urging force of the urging member 89, the cassette 6 is restricted from being lifted upward due to the urging force of the urging member 89.

For detaching the cassette 6 without the pressure portion 78 from the cassette receiving portion 8, the user takes out the cassette 6 by moving the cassette 6 upward while the cover 3 is opened. At this time, the first gear 28 maintains the first position to maintain meshing engagement with the second gear 24, and is kept disengaged from the third gear 27.

<Printing Operations>

Next, how the printing device 1 performs printing with the cassette 6 (with or without the pressure portion 78) based on print data will be described.

In the printing device 1, the motor 36 is controlled to rotate the tape conveyer roller 71, the movable conveyer roller 12, and the platen roller 11. Upon attachment of the cassette 6 to the cassette receiving portion 8, the heat-sensitive tape 51 and the adhesive tape 52 are paid out respectively by the co-operation of the tape conveyer roller 71, the movable conveyer roller 12, and the platen roller 11. In accordance with the rotation of the motor 36, the drive shaft 83 is rotated, thereby rotating the spool 75.

The print head 15 is also controlled while the motor 36 is controlled. Specifically, the plurality of the heat generating elements of the print head 15 is selectively heated based on the print data, while the heat-sensitive tape 51 is being conveyed. At this time, the heat-sensitive tape 51 is heated by the print head 15 from the overcoat layer side, the overcoat layer being positioned opposite to the base layer in the thickness direction of the heat-sensitive tape 51. An image based on the image data is thus formed (printed) on the heat-sensitive tape 51. The printed heat-sensitive tape 51 and the adhesive tape 52 are then conveyed by the rotation of the drive shaft 84 (tape conveyer roller 71) caused by the rotation of the motor 36.

A conveying speed of the heat-sensitive tape 51 and the adhesive tape 52 by the rotation of the movable conveyer roller 12 is switched in response to the change in the position in the upward/downward direction of the first gear 28. In the present embodiment, the conveying speed is set at a first conveying speed in a case where the cassette 6 including the monochromatic heat-sensitive tape 51 (without the pressure portion 78) is attached to the cassette receiving portion 8 and the first gear 28 is at the first position, whereas the conveying speed is set at a second conveying speed lower than the first conveying speed in a case where the cassette 6 including the color heat-sensitive tape 51 (including the pressure portion 78) is attached to the cassette receiving portion 8 and the first gear 28 is at the second position.

With this configuration, in the printing device 1, the heat-sensitive tape 51 can be conveyed more slowly and accurately during color printing (using the color heat-sensitive tape 51) than during monochromatic printing (using the monochromatic heat-sensitive tape 51), in order to secure a timeslot for heat transmission to each of the heat-sensitive layers corresponding to the three primary colors.

The printed heat-sensitive tape 51 and the adhesive tape 52 are bonded to each other to create the tape M, while being nipped between the movable conveyer roller 12 and the tape conveyer roller 71 with the printed heat-sensitive tape 51 superposed with the adhesive tape 52. As illustrated in FIG. 6, the tape M is then conveyed, through the guide portion 56, to be discharged out of the cassette 6 (casing 60). The tape M is subsequently conveyed to the cutter mechanism 17 and is cut by the cutter mechanism 17. The cut tape M is discharged to the outside of the printing device 1 through the ejection slit 10.

2. Second Embodiment

Next, a printing device 1A according to a second embodiment will be described with reference to FIGS. 9 and 10 wherein like parts and components are designated by the same reference numerals as those shown in FIGS. 1 through 8 to avoid duplicating description.

The printing device 1A according to the second embodiment is the same as the printing device 1 according to the first embodiment, except that the printing device 1A includes a power transmission portion 120 instead of the power transmission portion 20 of the first embodiment.

Figure 9:
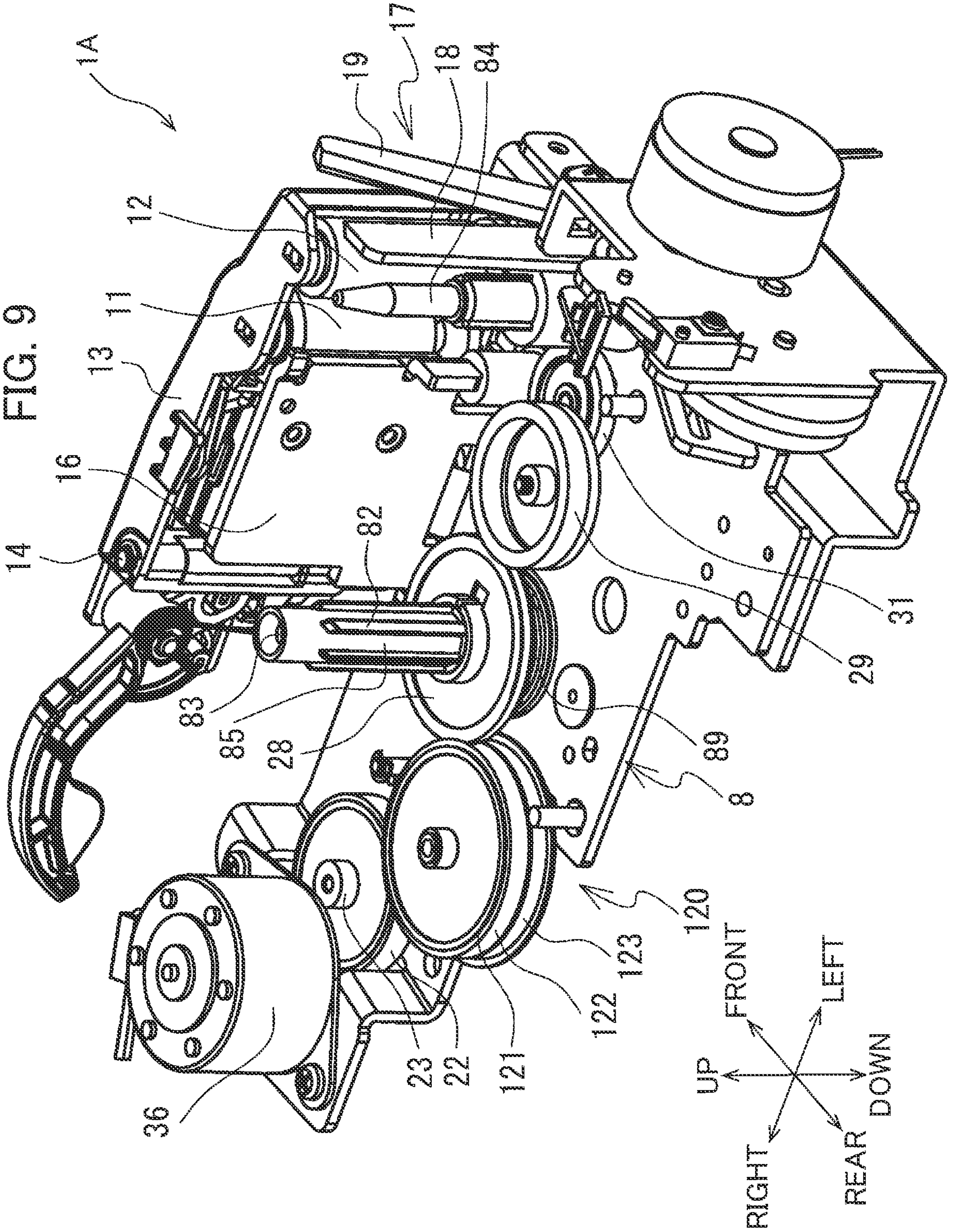
FIG. 9 is a perspective view illustrating the cassette receiving portion 8, the motor 36, and a power transmission portion 120 in a printing device 1A according to a second embodiment of the disclosure, in which delineation of the bottom surface of the cassette receiving portion 8 is omitted.
Figure 10:
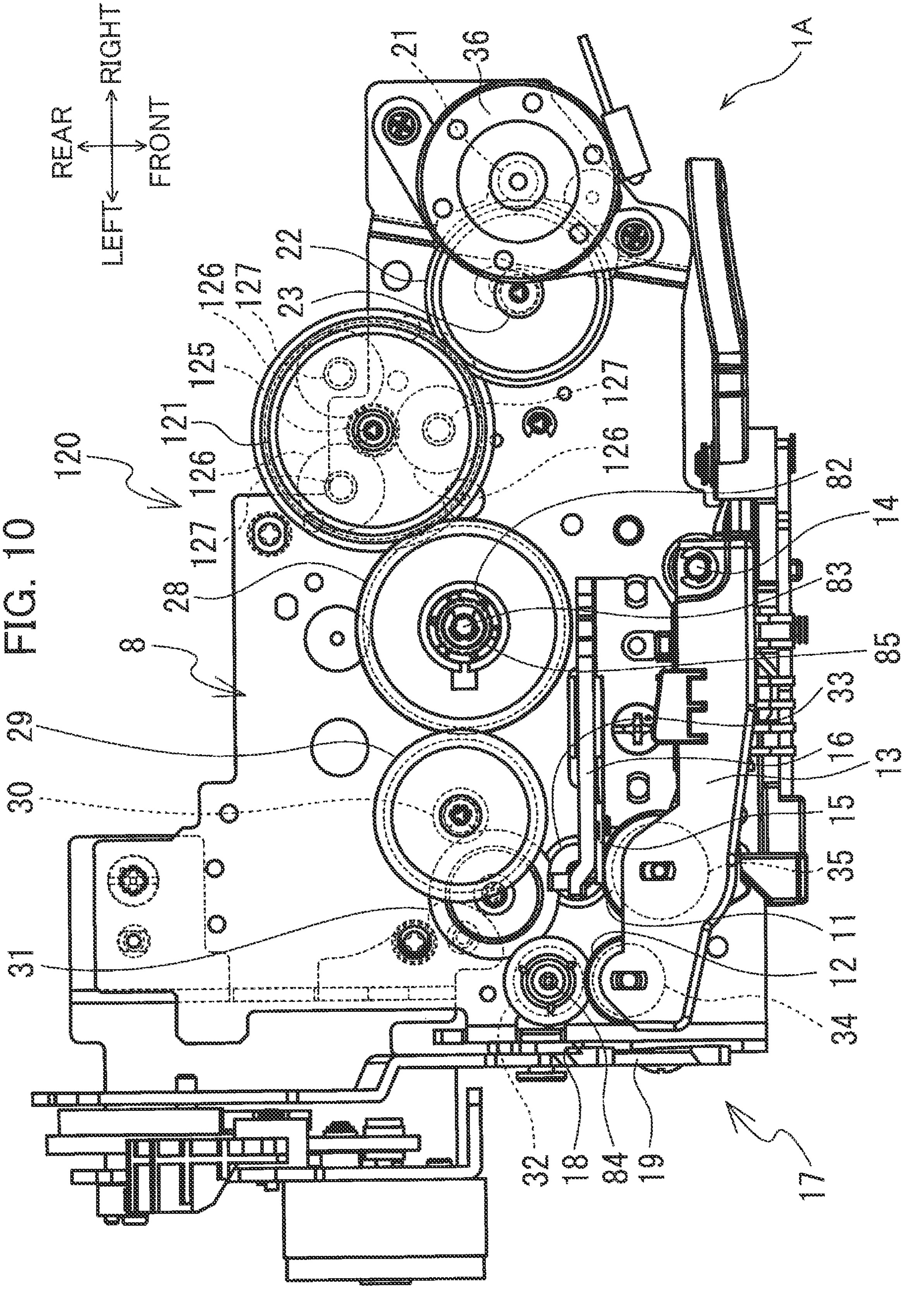
FIG. 10 is a plan view illustrating the cassette receiving portion 8, the motor 36, and the power transmission portion 120 in the printing device 1A according to the second embodiment.

As illustrated in FIGS. 9 and 10, the power transmission portion 120 of the second embodiment has the same configuration as the power transmission portion 20 of the first embodiment, except that the power transmission portion 120 includes a planetary gear mechanism instead of the gears 24 through 27 of the first embodiment. Specifically, in the power transmission portion 120, the planetary gear mechanism is constituted by an input gear 121, an output gear 122, a ring gear 123, a sun gear 125, and three planetary gears 126, and three output gear transmission portions 127. Incidentally, in FIGS. 9 and 10, delineation of gear teeth of the gears 21-23, 28-35, 121-123, 125 and 126 is omitted.

Specifically, the gear 22 is in meshing engagement with the input gear 121 positioned diagonally rearward and leftward of the gear 22. The sun gear 125 is coaxial with the input gear 121 and is rotated by the rotation of the input gear 121. Each of the three planetary gears 126 has a diameter smaller than that of the input gear 121. The three planetary gears 126 are arranged around the sun gear 125 at equi-intervals in a circumferential direction of the sun gear 125. Each of the planetary gears 126 is in meshing engagement with the sun gear 125.

The ring gear 123 has internal teeth in meshing engagement with each of the three planetary gears 126. The ring gear 123 and the sun gear 125 are aligned with each other in the upward/downward direction and are coaxial with each other. The output gear 122 is provided coaxially with the input gear 121, and is positioned between the input gear 121 and the sun gear 125. The output gear 122 has a diameter equal to that of the input gear 121. The output gear 122 is rotatable about its axis, independently of the rotation of the input gear 121 and the sun gear 125.

The three output gear transmission portions 127 extend downward from the output gear 122. The output gear transmission portions 127 are positioned at an equi-intervals in the circumferential direction of the sun gear 125. Each of the output gear transmission portions 127 rotatably supports corresponding one of the three planetary gears 126. The planetary gears 126 are orbitally movable about the sun gear 125 by the rotation of the sun gear 125 and by the meshing engagement with the ring gear 123. Thus, the output gear 122 is deceleratingly rotated about its axis by the orbital motion of the planetary gears 126.

The first gear 28 is meshingly engaged with the input gear 121 when the first gear 28 is at the first position, whereas the first gear 28 is meshingly engaged with the output gear 122 when the first gear 28 is at the second position. The first gear 28 is in meshing engagement with the gear 29 positioned leftward of the first gear 28 when the first gear 28 is at the first position and at the second position. As one example, the rotation number of the first gear 28 at the second position is one-fifth of the rotation number of the first gear 28 at the first position.

In the printing device 1A according to the second embodiment, the ratio of the rotation number of the platen roller 11 to the rotation number of the motor 36 can be switched between when the first gear 28 is at the first position and when the first gear 28 is at the second position, as in the printing device 1 according to the first embodiment. As a modification to the second embodiment, the first gear 28 at its first position may be engaged with the output gear 122, and the first gear 28 at its second position may be engaged with the input gear 121.

3. Third Embodiment

A printing device 101 according to a third embodiment will next be described with reference to FIGS. 11A through 15B wherein like parts and components are designated by the same reference numerals as those shown in FIGS. 1 through 8 to avoid duplicating description. FIGS. 12A and 12B illustrate a part of an internal structure of the printing device 101 in a state where the cassette 6 is attached to the cassette receiving portion 8, with a lever 110 at its leftward position (FIG. 12A) and at its rightward position (FIG. 12B), respectively.

The third embodiment is different from the first embodiment in that: a pressure portion 112 for moving the movable member 85 in the upward/downward direction (corresponding to the pressure portion 78 of the first embodiment) is provided on the cover 3, not on the cassette 6. That is, in the third embodiment, the cassette 6 does not include the pressure portion 78, regardless of whether the heat-sensitive tape 51 in the cassette 6 is of the color heat-sensitive type or of the monochromatic heat-sensitive type.

Specifically, the printing device 101 according to the third embodiment includes the lever 110, a sleeve portion 113, a guide member 130, a pressure member 112, and an urging member 119 for moving the first gear 28 from the first position to the second position through the movable member 85.

Figure 11A:
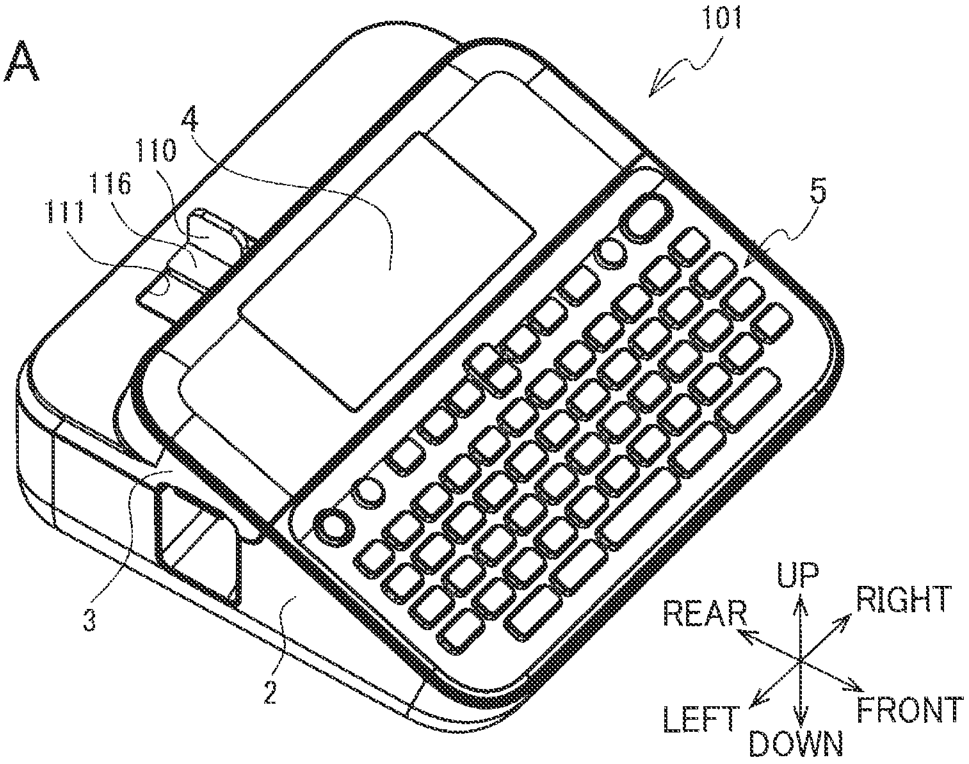
FIG. 11A is a perspective view of a printing device 101 according to a third embodiment of the disclosure in a state where a cover 103 thereof is closed.
Figure 11B:
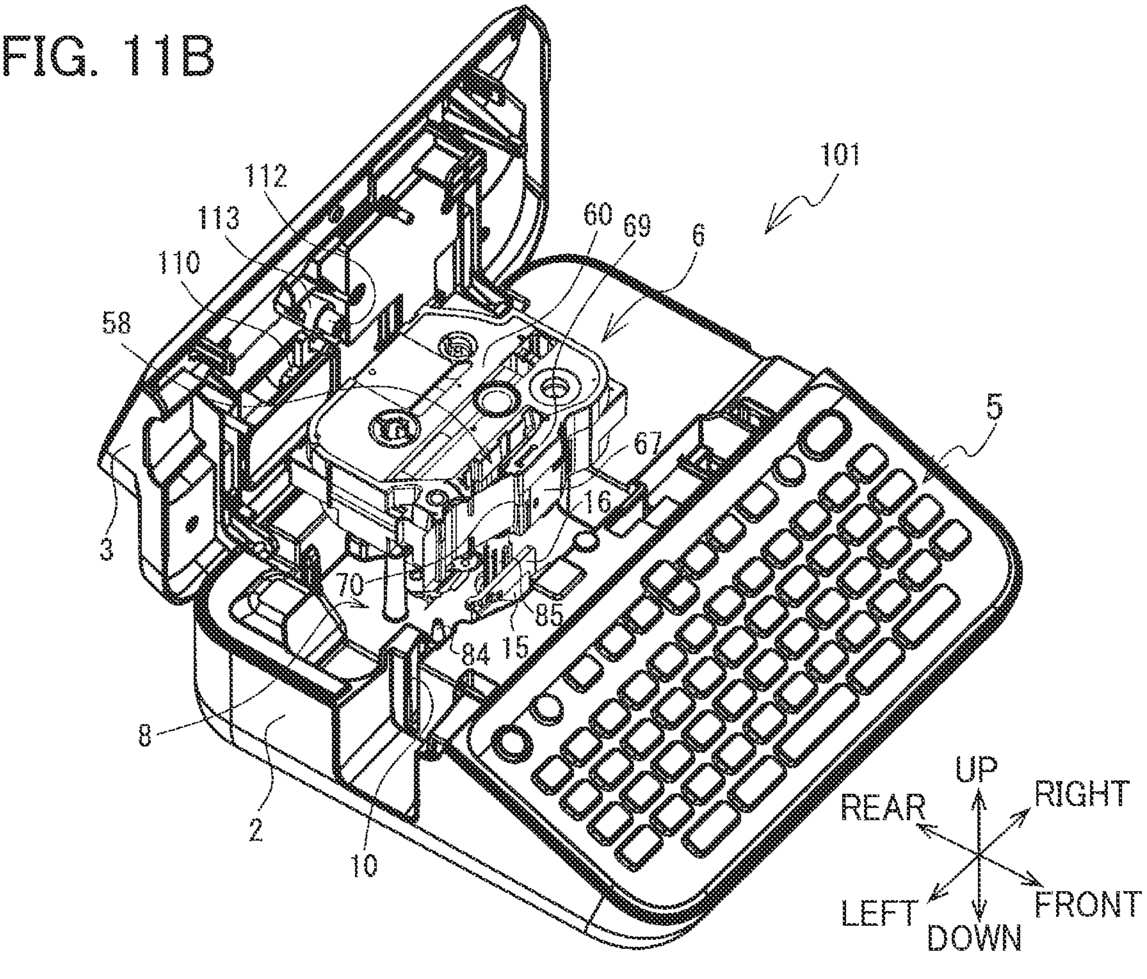
FIG. 11B is a perspective view of the printing device 101 according to the third embodiment in a state where the cover 103 is opened.
Figure 12A:
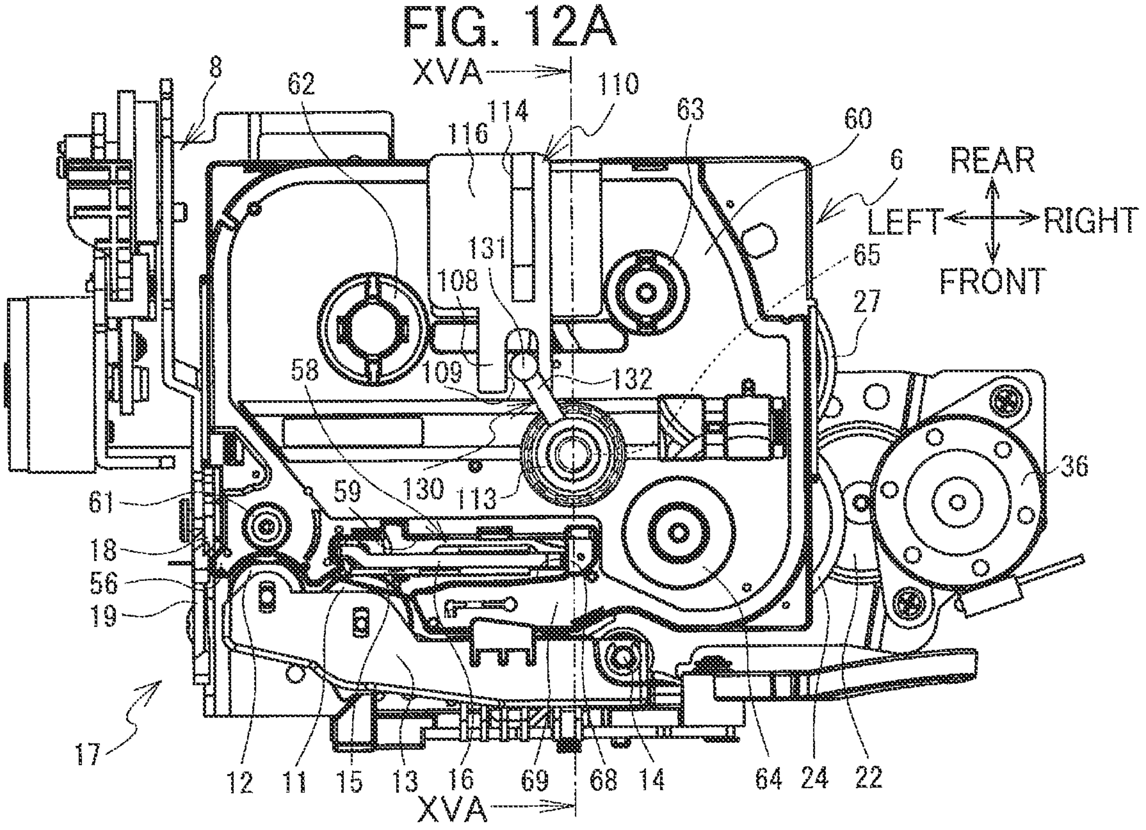
FIG. 12A is a plan view of the cassette receiving portion 8 on which the cassette 6 is mounted in the printing device 101 according to the third embodiment, and particularly illustrating a state where a lever 110 is positioned at a left end portion of a grooved portion 111 of the cover 103.
Figure 12B:
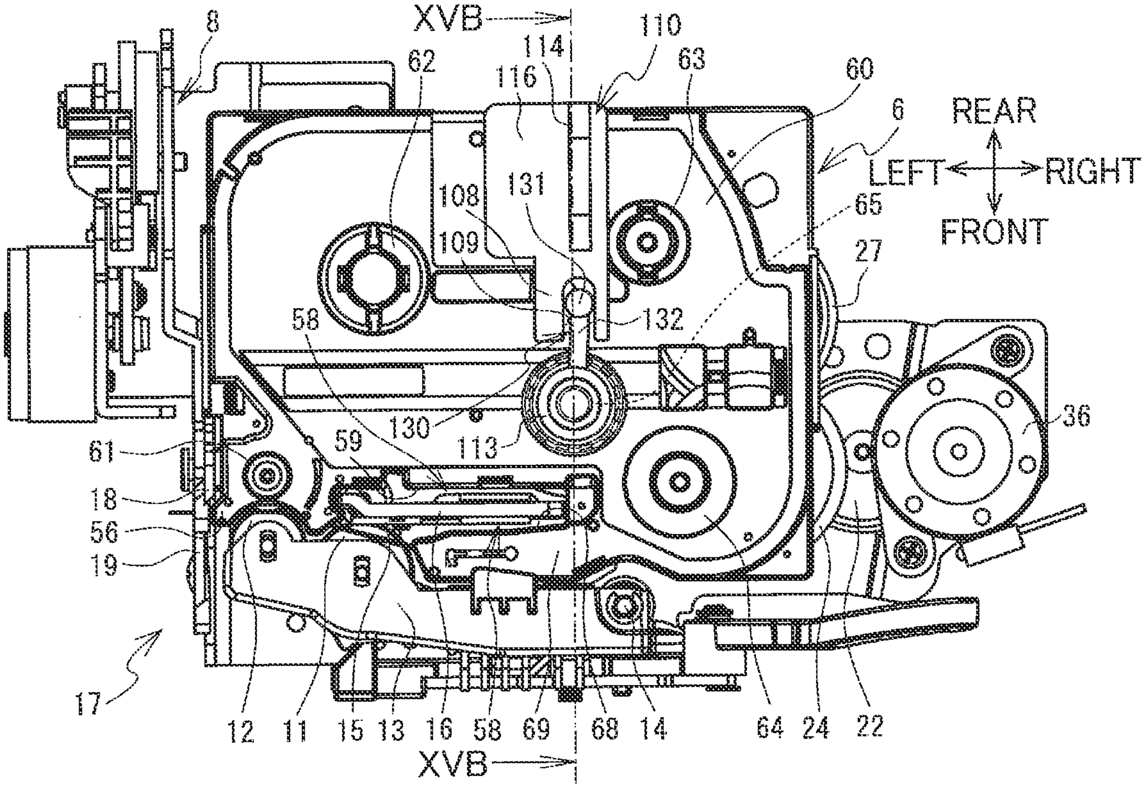
FIG. 12B is a plan view of the cassette receiving portion 8 on which the cassette 6 is mounted in the printing device 101 according to the third embodiment, and particularly illustrating a state where the lever 110 is positioned at a right end portion of the grooved portion 111 of the cover 103.

As best shown in FIG. 11A, the lever 110 is supported in a grooved portion 111 formed on the upper surface of the cover 3. The grooved portion 111 is formed on a left rear portion of the upper surface of the cover 3, and has a rectangular shape in a plan view. The lever 110 is movable in the leftward/rightward direction within the grooved portion 111.

The lever 110 includes a plate part 116, a pinched part 114, and a guiding part 108 (FIGS. 12A-12B, and 14A-14B). The plate part 116 is plate-shaped and extends approximately parallel to a bottom surface of the grooved portion 111. The pinched part 114 has a plate-like shape extending upward from a right end portion of the plate part 116. The guiding part 108 extends frontward from a right region of a front end of the plate part 116. The guiding part 108 is positioned in an internal space defined between the cover 3 and the housing 2 when the cover 3 is closed relative to the housing 2. The guiding part 108 has a front end portion formed with a notch 109 that is recess rearward to have an inverted U-shape.

Figure 13B:
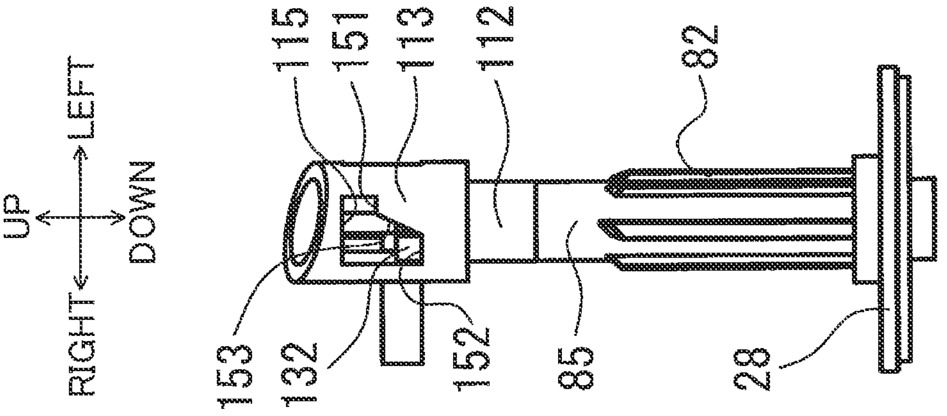
FIG. 13B is a rear view illustrating the sleeve portion 113, the second rod part 132, the pressure member 112 and the movable member 85 in a state where the lever 110 is positioned at the right end portion of the grooved portion 111 in the printing device 101 according to the third embodiment.
Figure 13A:
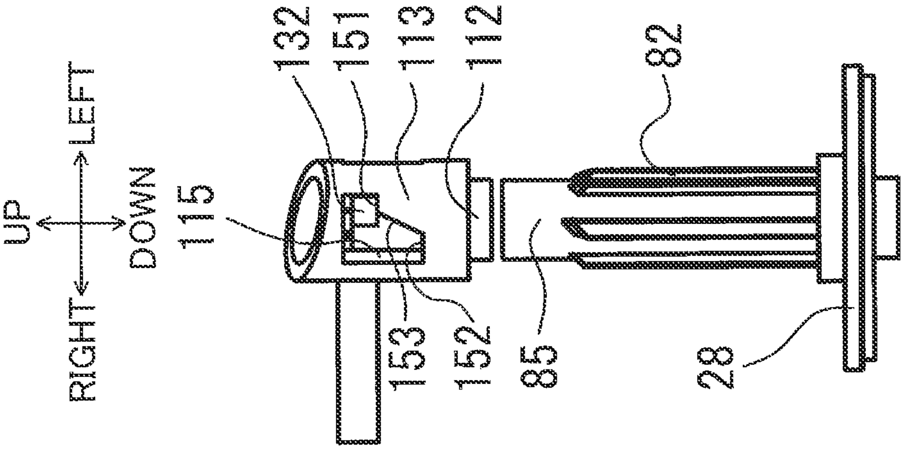
FIG. 13A is a rear view illustrating a sleeve portion 113, a second rod part 132, a pressure member 112 and a movable member 85 in a state where the lever 110 is positioned at the left end portion of the grooved portion 111 in the printing device 101 according to the third embodiment.

As illustrated in FIGS. 13A and 13B, the sleeve portion 113 has a hollow cylindrical shape and protrudes downward from the lower surface of the cover 3 at a position to face the drive shaft 83 when the cover 3 is closed. The sleeve portion 113 is formed with a guide hole 115 extending throughout a thickness of a peripheral wall of the sleeve portion 113. The guide hole 115 has a bending lower edge including a first linear edge line 152 extending in the leftward/rightward direction, a sloping edge line 153 extending diagonally upward and leftward from a left end of the first linear edge line 152, and a second linear edge line 151 extending leftward from a left end of the sloping edge line 153. The first linear edge line 152 is positioned rightward of the sloping edge line 153, and the second linear edge line 151 is positioned leftward of the sloping edge line 153. The second linear edge line 151 extends in the leftward/rightward direction at a position diagonally above the first linear edge line 152.

The guide member 130 is configured to switch the position in the upward/downward direction of the pressure member 112 in association with the leftward/rightward position of the lever 110. Specifically, the guide member 130 includes a first rod part 131 and a second rod part 132 connected to the first rod part 131. The first rod part 131 has a solid cylindrical shape extending in the upward/downward direction. The first rod part 131 is positioned in the notch 109 of the guiding part 108, so that the first rod part 131 is movable in the leftward/rightward direction in accordance with the leftward/rightward movement of the lever 110.

The second rod part 132 extends from the first rod part 131 in a direction perpendicular to the upward/downward direction. Specifically, the second rod part 132 has a rear end fixed to the first rod part 131. The second rod part 132 has a front end portion positioned in the guide hole 115 of the sleeve portion 113 and seated on the lower edge of the guide hole 115. The front end portion of the second rod part 132 is connected to the pressure member 112 positioned in the hollow space of the sleeve portion 113.

In accordance with the movement of the first rod part 131 in the leftward/rightward direction by the movement of the lever 110 in the leftward/rightward direction, the second rod part 132 is also moved along the lower edge of the guide hole 115. Hence, the vertical position of the second rod part 132 can be changed in accordance with the leftward/rightward movement of the lever 110, thereby changing the vertical position of the pressure member 112.

The pressure member 112 is solid cylindrical in shape and extends in the upward/downward direction. The pressure member 112 has a lower end 117 formed with a recess 118 recessed upward therefrom (see FIGS. 15A and 15B). The pressure member 112 is configured to abut on the movable member 85 to push the movable member 85 downward in accordance with the leftward/rightward position of the lever 110 in the attached state of the cassette 6 to the cassette receiving portion 8.

As described above, the pressure member 112 is connected to the front end portion of the second rod part 132, and has an upper end portion positioned in the hollow space of the sleeve portion 113. The urging member 119 (FIG. 14B) is positioned in the hollow space of the sleeve portion 113, and has a lower end portion seated on the pressure member 112 to resiliently urge the pressure member 112 downward. The inner peripheral surface defining the hollow space of the sleeve portion 113 guides vertical movement of the pressure member 112.

Figure 14A:
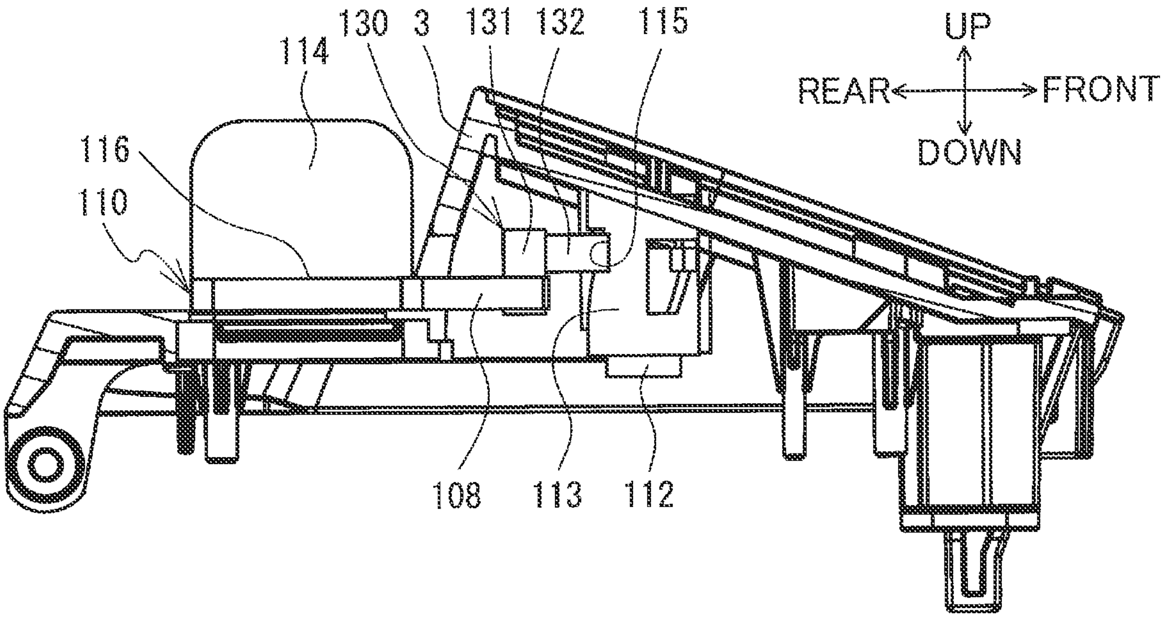
FIG. 14A is a cross-sectional view illustrating the lever 110, the sleeve portion 113, the second rod part 132, and the pressure member 112 as viewed from a left side thereof in the state where the lever 110 is positioned at the left end portion of the grooved portion 111 in the printing device 101 according to the third embodiment.
Figure 14B:
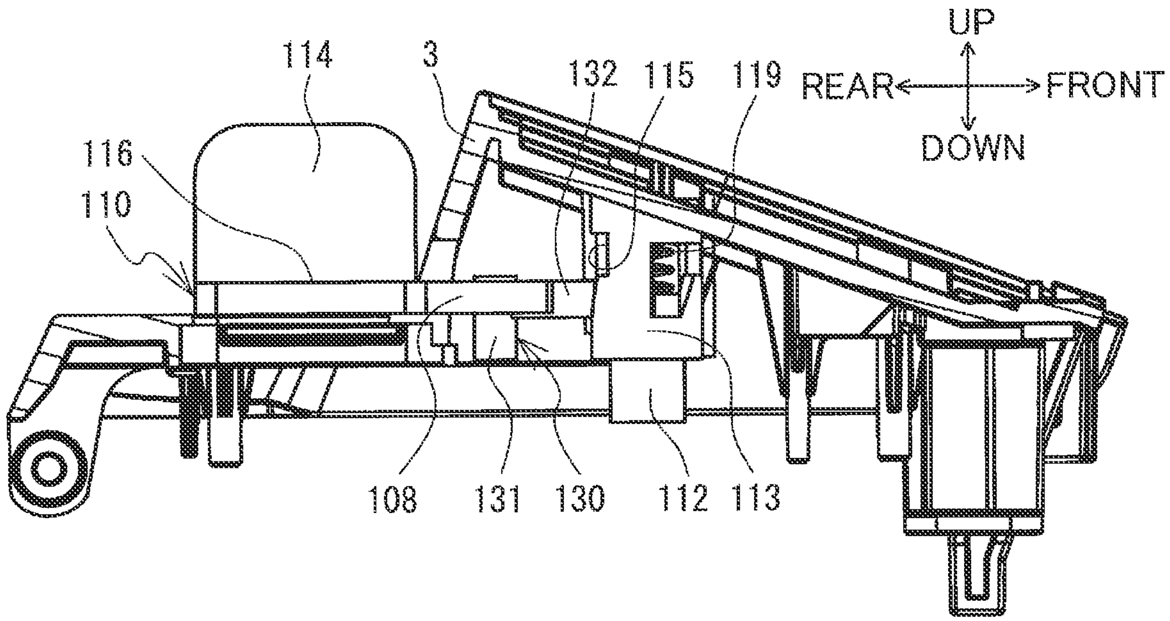
FIG. 14B is a cross-sectional view illustrating the lever 110, the sleeve portion 113, the second rod part 132, and the pressure member 112 as viewed from the left side in the state where the lever 110 is positioned at the right end portion of the grooved portion 111 in the printing device 101 according to the third embodiment.

In a case where the lever 110 is positioned at a left end portion of the grooved portion 111 as illustrated in FIG. 12A, the front end portion of the second rod part 132 of the guide member 130 is positioned on the second linear edge line 151 as illustrated in FIGS. 13A and 14A. On the other hand, in a case where the lever 110 is positioned at a right end portion of the grooved portion 111 as illustrated in FIG. 12B, the front end portion of the second rod part 132 of the guide member 130 is positioned on the first linear edge line 152 as illustrated in FIGS. 13B and 14B.

Here, as illustrated in FIGS. 13A and 13B, a downward protruding length of the pressure member 112 from the sleeve portion 113 is greater in the case where the front end portion of the second rod part 132 is positioned on the first linear edge line 152 than in the case where the front end portion of the second rod part 132 is positioned on the second linear edge line 151.

Figure 15A:
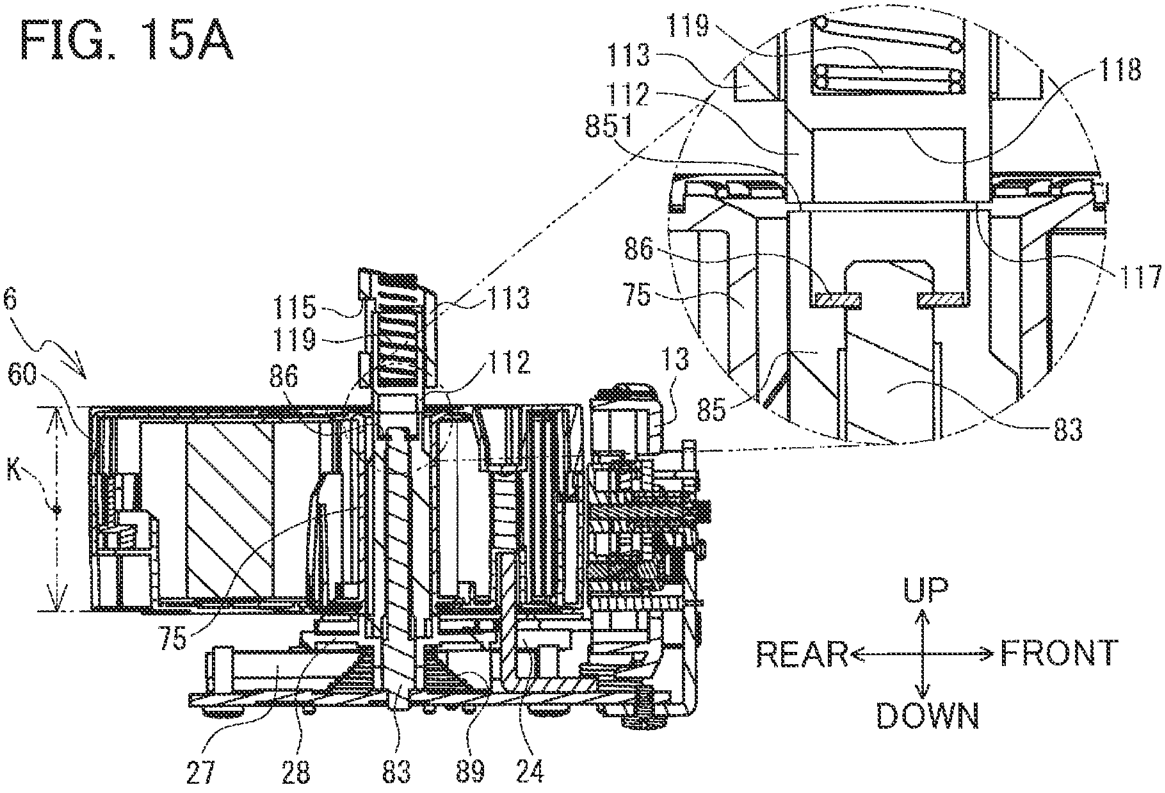
FIG. 15A is a cross-sectional view of the cassette 6 mounted on the cassette receiving portion 8 in the printing device 101 according to the third embodiment taken along a line XVA-XVA in FIG. 12A.
Figure 15B:
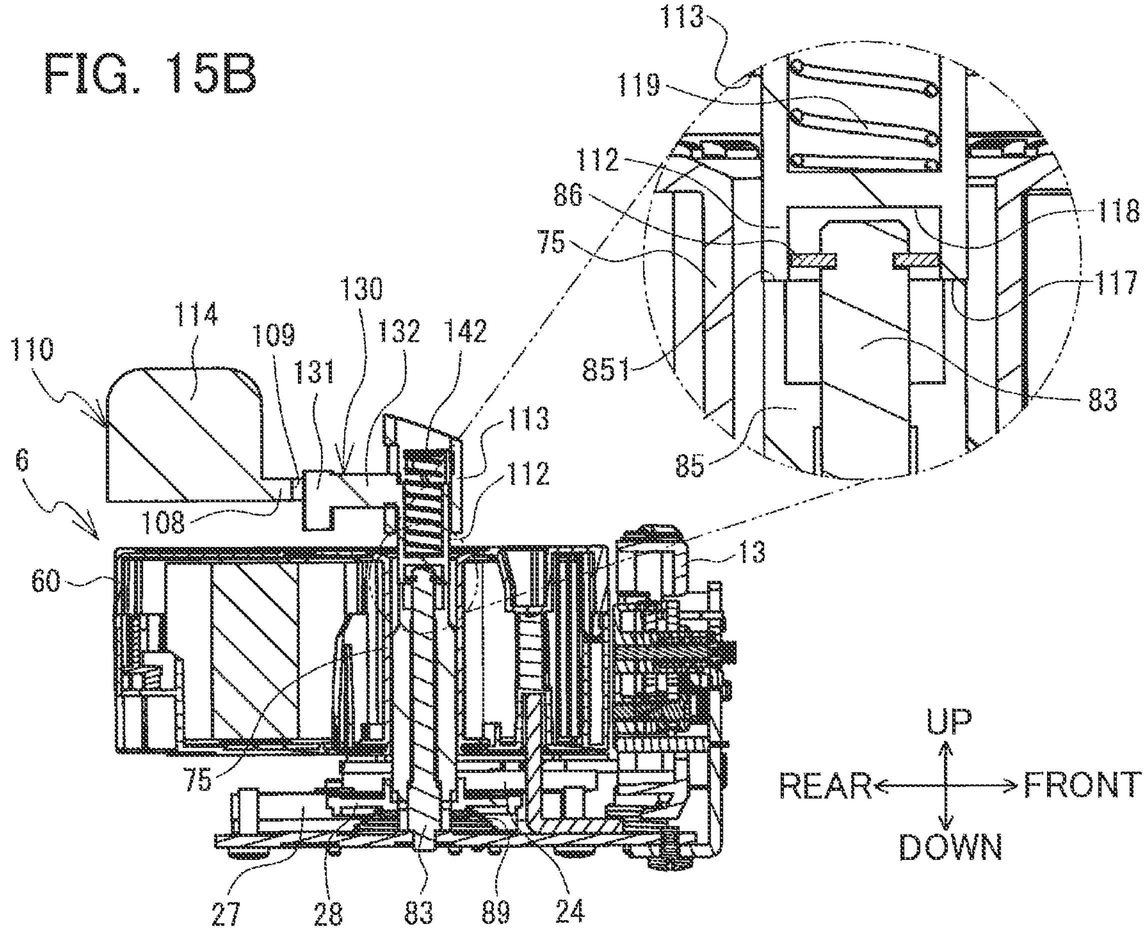
FIG. 15B is a cross-sectional view of the cassette 6 mounted on the cassette receiving portion 8 in the printing device 101 according to the third embodiment taken along a line XVB-XVB in FIG. 12B.

When the cassette 6 incorporating the monochromatic heat-sensitive tape 51 is attached to the cassette receiving portion 8, a user pinches the plate part 116 of the lever 110 and moves the plate part 116 leftward as illustrated in FIG. 12A. Since the downward protruding amount of the pressure member 112 is small (FIGS. 13A and 14A), a lower end 117 of the pressure member 112 is separated away from the upper end 851 of the movable member 85, as illustrated in FIGS. 13A and 15A. Alternatively, the lower end 117 of the pressure member 112 may contact the upper end 851 of the movable member 85.

Further, the upper end of the drive shaft 83 is spaced away from the recess 118 formed in the lower end 117 of the pressure member 112. Since the pressure member 112 is separated from the movable member 85, the first gear 28 is urged upward by the urging member 89 to be at the first position. Hence, the first gear 28 is engaged with the second gear 24.

When the cassette 6 incorporating the color heat-sensitive tape 51 (without the pressure portion 78) is attached to the cassette receiving portion 8, a user pinches the plate part 116 of the lever 110 and moves the plate part 116 rightward, as illustrated in FIG. 12B. Since the pressure member 112 protrudes downward by a large amount (as illustrated in FIG. 13B), the lower end 117 of the pressure member 112 abuts on the upper end 851 of the movable member 85 to move the movable member 85 downward against the urging force of the urging member 89. Hence, the first gear 28 is moved from the first position to the second position. The first gear 28 is brought into meshing engagement with the third gear 27. At this time, the upper end of the movable member 85 is spaced away from the recess 118 of the pressure member 112. Since the upper end 851 of the movable member 85 is in abutment with the lower end 117 of the pressure member 112 and the movable member 85 is urged downward, lifting-up of the cassette 6 due to urging force of the urging member 89 can be obviated.

4. Technical Advantages of the First to Third Embodiments

The printing device 1 according to the first embodiment and the printing device 101 according to the third embodiment include the print head 15, the motor 36, the cassette receiving portion 8, and the power transmission portion 20. The printing device 1A according to the second embodiment includes the print head 15, the motor 36, the cassette receiving portion 8 and the power transmission portion 120. The motor 36 is configured to drive the platen roller 11 facing the print head 15. The cassette receiving portion 8 is configured to receive the cassette 6 incorporating the printing tape (such as the heat-sensitive tape 51) to be printed by the print head 15.

The power transmission portion 20, 120 includes a plurality of gears including the first gear 28 that is movable downward from the first position to the second position lower than the first position. That is, the first gear 28 is moved from the first position to the second position which is downstream of the first position in the attaching direction of the cassette 6. In the power transmission from the motor 36 to the platen roller 11, the power transmission portion 20 switches the ratio of the rotation number of the platen roller 11 to the rotation number of the motor 36 between when the first gear 28 is at the first position and when the first gear 28 is at the second position. Hence, in the printing device 1, 1A and 101, the rotation speed of the platen roller 11 can be changed by shifting the position of the first gear 28 from the first position to the second position and vice versa.

For example, the rotation speed of the platen roller 11 can be switched to an appropriate speed depending on or in response to the kinds of the printing tape of the cassette 6 in an attempt to balance consideration of printing quality and printing efficiency with respect to each kind of the printing tape. There is no need to perform an operation for origin confirmation of the motor 36. As a result, printing can be started promptly in a shorter time each time switching of the rotation speed of the platen roller 11 is performed.

Further, the printing device 1, 1A, 101 according to the first through third embodiments includes the movable member 85 provided in the cassette receiving portion 8. The first gear 28 of the power transmission portion 20, 120 is movable from the first position to the second position by the downward movement of the movable member 85. That is, in the printing device 1, 1A, and 101, the first gear 28 can be moved from the first position to the second position through the movable member 85. Employing the movable member 85 for moving the first gear 28 from the first position to the second position can provide a higher degree of freedom in designing the printing device 1, 1A and 101, in comparison with a conceivable structure where the first gear 28 is moved to the second position by direct application of downward pressure to the first gear 28.

In the printing device 1, 1A according to the first and second embodiments, the movable member 85 is pressed downward by the pressure portion 78 of the cassette 6 attached to the cassette receiving portion 8, thereby moving the first gear 28 from the first position to the second position. On the other hand, the movable member 85 is maintained at the first position in the case where the cassette 6 without the pressure portion 78 is attached to the cassette receiving portion 8. In the printing device 1, 1A, no particular user's operation is required for switching the rotation speed of the platen roller 11. That is, in the first and second embodiments, the rotation speed of the platen roller 11 can be automatically switched mechanically in response to presence or absence of the pressure portion 78 in the cassette 6.

In the printing device 1, 1A according to the first and second embodiments, the drive shaft 83 is connected to the first gear 28 and is rotated by the rotation of the motor 36; and the movable member 85 is disposed over the drive shaft 83 such that the movable member 85 is movable downward relative to the drive shaft 83. Upon attachment of the cassette 6 to the cassette receiving portion 8, the drive shaft 83 and the movable member 85 are inserted in the spool 75 of the cassette 6, and the movable member 85 is pressed by the pressure portion 78 provided on the inner peripheral surface of the spool 75 to move the first gear 28 from the first position to the second position. The movable member 85 can have a relatively simplified configuration in the printing device 1, 1A. Further, the movable member 85 can be moved downward in accordance with the attachment of the cassette 6 to the cassette receiving portion 8.

The printing device 101 according to the third embodiment includes the lever 110 for moving the first gear 28 from the first position to the second position through the movable member 85. That is, the rotation speed of the platen roller 11 can be switched by user's operation to the lever 110. This configuration can realize enhanced user's convenience in switching of the rotation speed of the platen roller 11, compared to a conventional printing device without the lever 110.

The printing device 1, 1A, 101 according to the first through third embodiments includes the urging member 89 that urges the first gear 28 upward. With this structure, the first gear 28 at the second position can be moved back to the first position with ease.

The printing device 1, 1A according to the first and the second embodiments includes the pressure member 88, 112 configured to contact the upper end portion of the drive shaft 83 in the attached state of the cassette 6 to the cassette receiving portion 8. With this structure, even if the attached cassette 6 is lifted upward due to the urging force of the urging member 89, the pressure portion 78 is brought into contact with the pressure member 88 so that the attached cassette 6 can be restricted from moving further upward.

The power transmission portion 20 in the printing device 1 according to the first embodiment includes the plurality of gears 21 through 35 including the second gear 24 and the third gear 27 whose positions in the upward/downward direction are different from each other. The first gear 28 is engaged with the second gear 24 when the first gear 28 is at the first position, while the first gear 28 is engaged with the third gear 27 when being at the second position. In the printing device 1, the gear to be engaged with first gear 28 can be mechanically switched dependent on the position (the first position and the second position) of the first gear 28. The configuration of the movable member 85 can be made relatively simpler than otherwise.

The power transmission portion 120 in the printing device 1A according to the second embodiment includes a plurality of gears including the input gear 121, the sun gear 125 rotatable integrally with the input gear 121, the planetary gears 126 in meshing engagement with the sun gear 125, and the output gear 122 rotatable in interlocking relation to the orbital movement of the planetary gears 126 about the sun gear 125. The first gear 28 is engaged with the input gear 121 when the first gear 28 is at the first position, and is engaged with the output gear 122 when the first gear 28 is at the second position. In the printing device 1A as well, the gear to be engaged with first gear 28 can be mechanically switched dependent on the position (the first position and the second position) of the first gear 28. Further, the input gear 121 and the output gear 122 can be provided coaxially with each other.

5. Modifications and Variations

Various modifications are conceivable.

For example, the kinds, shape, and dimension of the cassette 6 attachable to the printing device 1, 1A, 101 according to the first through third embodiments may be suitably altered. Further, the printing device of the disclosure may not include the platen roller 11, or the platen roller 11 may be detachably attachable to the printing device. Still alternatively, the platen roller 11 may be provided in the cassette 6 rather than in the printing device. In place of the urging member 89, a leaf spring may be employed, as long as the leaf spring can urge the first gear 28 upward (toward the cassette 6).

The printing device 1 may be exclusively used for a heat-sensitive type cassette. In this case, the drive shaft 83 for taking up an ink ribbon may be omitted. The pressure member 88 may not be provided in the printing device 1, or the configuration of the pressure member 88 may be suitably modified. For example, the pressure member 88 may be configured to downwardly press the upper surface of the casing 60 of the cassette 6. The pressure member 88 may not be urged by the urging member 96. The pressure member 88 may be made from an elastic material such as resin.

Further, the number, size, and layout of the gears in the power transmission portion 20, 120 may be suitably modified. The first gear 28 of the power transmission portion 20, 120 may be movable among not less than three different positions in the attaching direction of the cassette 6, and the first gear 28 may be engaged with different gears each at the not less than three different positions. The attaching direction of the cassette 6 is the moving direction of the cassette 6 when the cassette 6 is attached to the cassette receiving portion 8, and may be suitably altered in accordance with the structures of the printing device t and the cassette 6. For example, the attaching direction may be a thickness direction of the cassette.

The power transmission portion 20, 120 may be configured to move a gear other than the first gear 28 that rotates the drive shaft 83 between the first position and the second position in order to switch the rotation speed of the platen roller 11. Further, the power transmission portion 20, 120 may be configured such that: the first gear 28 may be engaged with an identical gear positioned at upstream side of the first gear 28 in a power transmitting direction regardless of the first position and the second position of the first gear 28; and the first gear 28 at its first position may be engaged with a gear positioned at downstream side of the first gear 28, but the first gear 28 at its second position may be engaged with another gear positioned at the downstream side of the first gear 28.

The first gear 28 may be moved from the first position to the second position without interposition of the movable member 85, unlike in the printing device 1, 1A, 101. For example, the first gear 28 may be moved from the first position to the second position by direct contact thereof with a protruding portion provided on an outer surface of a cassette.

Figure 16:
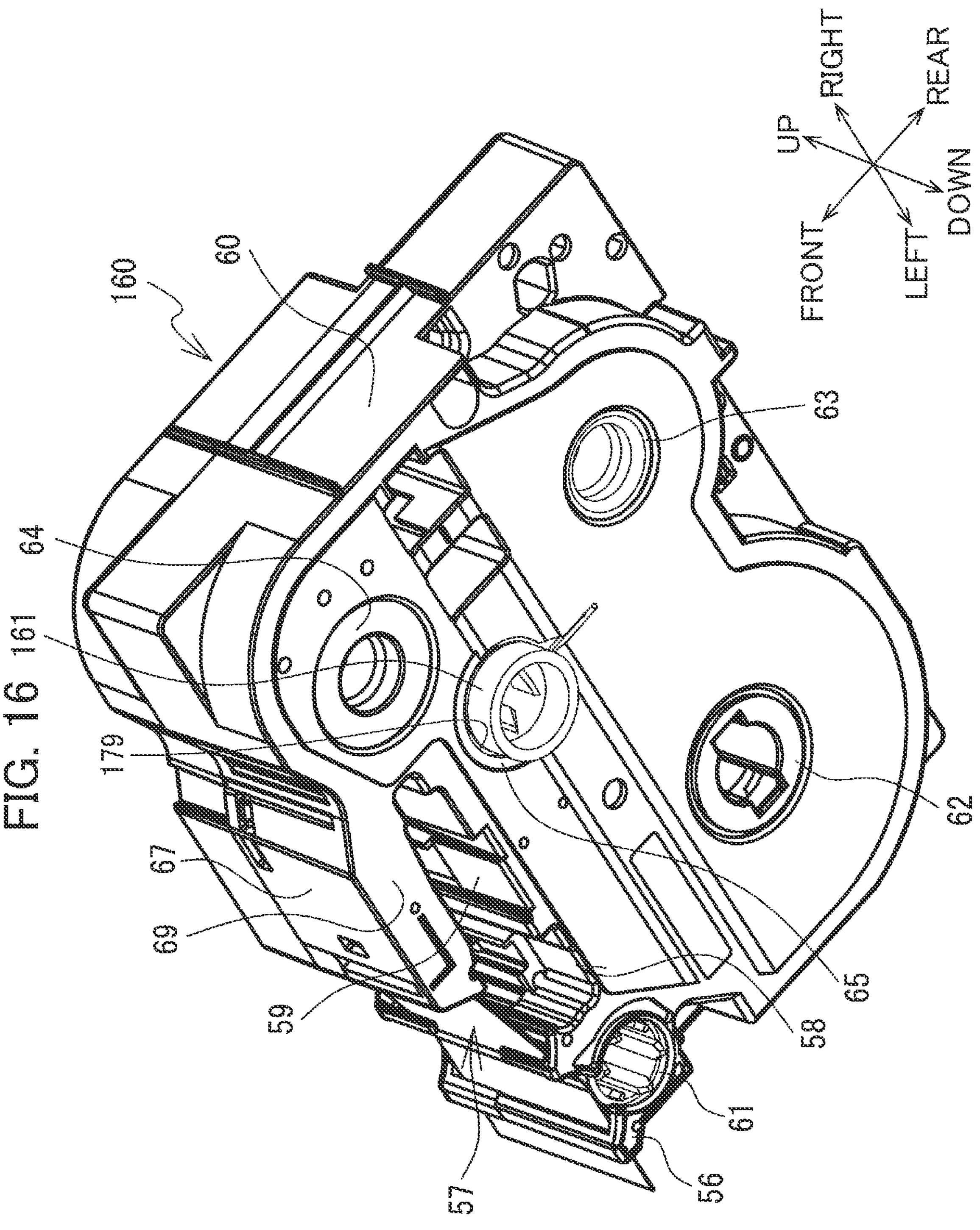
FIG. 16 is a perspective view of a cassette 160 according to a variation of the first embodiment.
Figure 17:
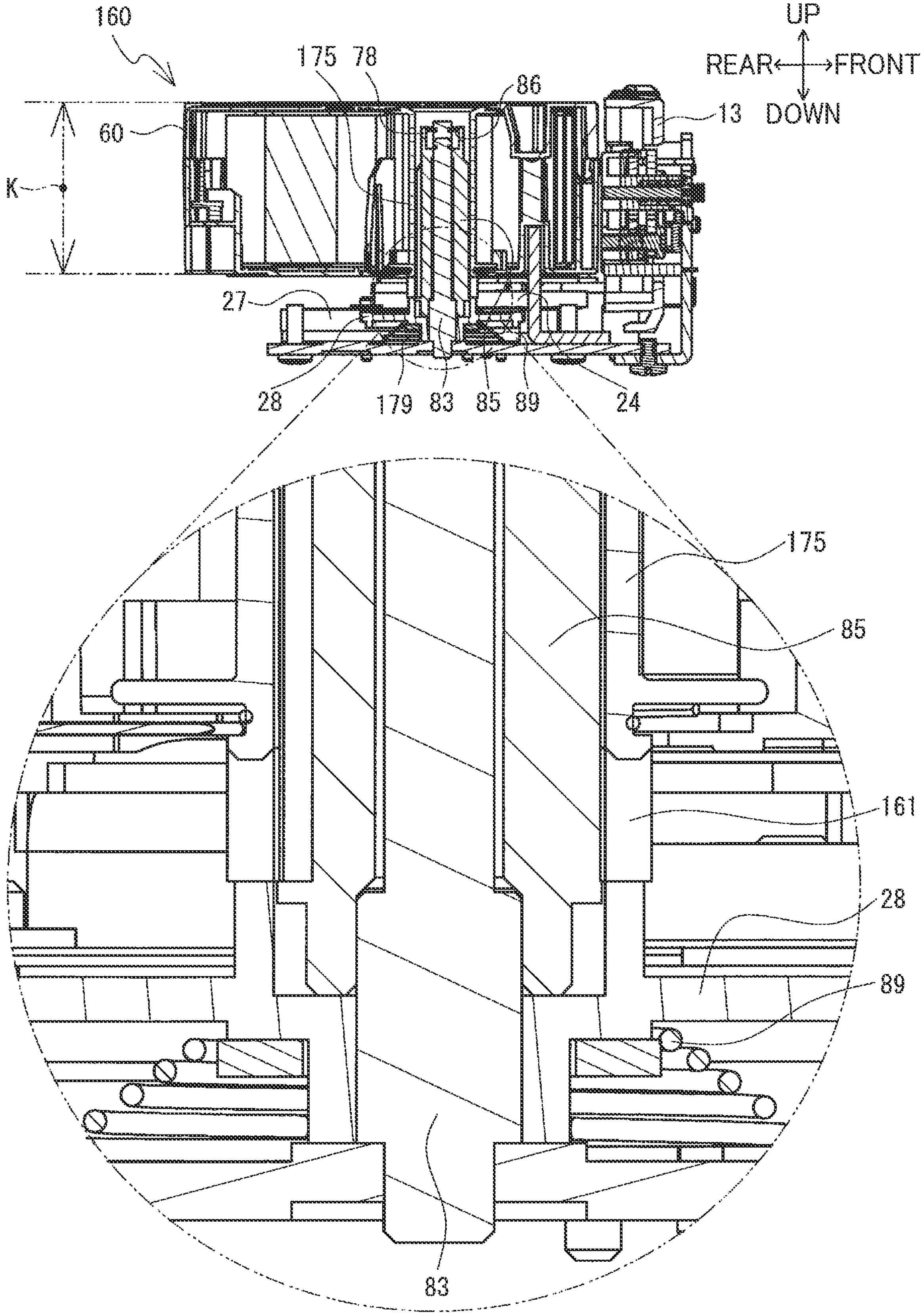
FIG. 17 is a cross-sectional view of the cassette receiving portion 8 and the cassette 160 mounted thereon taken along a line corresponding to the line VII-VII of FIG. 5.

More specifically, FIGS. 16 and 17 illustrate a modification to the first embodiment in which the first gear 28 is directly moved downward through a pressure portion 161 provided on a lower surface of a cassette 160. In FIGS. 16 and 17, like parts and components are designated by the same reference numerals as those shown in FIGS. 1 through 8.

The modification is the same as the first embodiment except that: the cassette 160 according to the modification includes the pressure portion 161, instead of the pressure portion 78 provided on the inner peripheral surface of the spool 75 of the cassette 6; and a spool 175 of the cassette 160 is positioned above the pressure portion 161 such that a hollow space of the spool 175 is in alignment with an opening 179 formed in the bottom wall of the casing 60.

The pressure portion 161 is hollow cylindrical in shape and extends downward from the lower surface of the casing 60 of the cassette 160. Although not illustrated, the bottom wall of the cassette receiving portion 8 is formed with a through-hole having a circular shape in a plan view. In the attached state of the cassette 160 to the cassette receiving portion 8, the drive shaft 83, the movable member 85 disposed over the drive shaft 83, and the pressure portion 161 disposed over the movable member 85 can extend through the through-hole.

As illustrated in FIG. 17, in the attached state of the cassette 160 to the cassette receiving portion 8, the lower end of the pressure portion 161 abuts on an upper end of the first gear 28 to move the first gear 28 downward against the urging force of the urging member 89. Hence, the first gear 28 is moved from the first position to the second position to meshingly engage the third gear 27.

Although not illustrated, the upper end of the drive shaft 83 may be in abutment with the recess 882 (FIG. 8) recessed upward from the lower end 881 of the pressure member 88. With this structure, even if the attached cassette 160 is lifted upward due to the urging force of the urging member 89, the attached cassette 160 is restricted from moving further upward due to the urging force of the urging member 89.

In accordance with detachment of the cassette 160 from the cassette receiving portion 8, the lower end of the pressure portion 161 is separated away from the upper end of the first gear 28. Hence, the first gear 28 is moved upward from the second position to the first position by the urging force of the urging member 89 to meshingly engage the second gear 24.

In the printing device according to this modification, the cassette 160 provided with the pressure portion 161 (i.e., incorporating the color heat-sensitive tape 51), and a cassette without the pressure portion 161 (i.e., the cassette 6 incorporating the monochromatic heat-sensitive tape 51 of the first embodiment) can be selectively attachable to the cassette receiving portion 8. In the power transmission from the motor 36 to the platen roller 11, the ratio of the rotation number of the platen roller 11 to the rotation number of the motor 36 is switchable between a state where the cassette 6 without the pressure portion 161 is attached to the cassette receiving portion 8 (so that the first gear 28 is maintained at the first position) and a state where the cassette 160 including the pressure portion 161 is attached to the cassette receiving portion 8 (so that the first gear 28 is moved to the second position). In this modification, the movable member 85 may be immovable in the upward/downward direction with respect to the drive shaft 83.

While the description has been made in detail with reference to the specific embodiments, it would be apparent to those skilled in the art that various changes and modifications may be made therein without departing from the scope of the disclosure. Further, different techniques disclosed in respective embodiments would be combined as appropriate.

REMARKS

The printing device 1, 1A and 101 is an example of a printing device. The cassette receiving portion 8 is an example of a cassette receiving portion. The print head 15 is an example of a print head. The platen roller 11 is an example of a platen roller. The motor 36 is an example of a motor. The power transmission portion 20, 120 is an example of a power transmission portion. The first gear 28 is an example of a first gear. The second gear 24 is an example of a second gear, and the third gear 27 is an example of a third gear. The movable member 85 is an example of a movable member. The cassette 6, 160 is an example of a cassette. The pressure portion 78 is an example of a pressure portion of the cassette. The attaching direction of the cassette 6, 160 to the cassette receiving portion 8 is an example of a first direction.

What is claimed is:

1. A printing device comprising:
- a print head;
- a platen roller positioned to face the print head;
- a motor configured to generate a driving force to rotate the platen roller;
- a cassette receiving portion configured to detachably receive a cassette, the cassette incorporating a printing tape to be printed by the print head, and the cassette being attachable to the cassette receiving portion in a first direction;
- a power transmission portion configured to transmit the driving force of the motor to the platen roller, the power transmission portion comprising a plurality of gears including a first gear movable from a first position to a second position downstream of the first position in the first direction, and
  - the power transmission portion being configured to switch a ratio of a rotation number of the platen roller to a rotation number of the motor depending on whether the first gear is at the first position or at the second position to transmit the driving force to the platen roller;
- a movable member provided at the cassette receiving portion and movable in the first direction; and
- a drive shaft connected to the first gear and configured to rotate upon receipt of the driving force from the motor, the movable member being disposed over the drive shaft and movable in the first direction relative to the drive shaft,
- wherein the first gear is moved from the first position to the second position in association with movement of the movable member in the first direction;
- the cassette being one of a first cassette type and a second cassette type, the cassette receiving portion configured to both (a) receive the first cassette type so as to provide a first printing device arrangement of a first case, and (b) receive the second cassette type so as to provide a second printing device arrangement of a second case,
- the first cassette type includes a pressure portion configured to contact the movable member, and
- the second cassette type does not include a pressure portion configured to contact the movable member; and
- in the first case, in which the first cassette type including the pressure portion is attached to the cassette receiving portion, the pressure portion contacts and moves the movable member in the first direction to move the first gear from the first position to the second position, in the second case, in which the second cassette type without the pressure portion is attached to the cassette receiving portion, the first gear is maintained at the first position, wherein the cassette includes a spool having a hollow cylindrical shape, the drive shaft and the movable member being inserted in a hollow space of the spool to rotate the spool upon attachment of the cassette to the cassette receiving portion, and wherein, in the first case, in which the first cassette type includes the pressure portion:

the pressure portion is provided at an inner peripheral surface of the spool, the inner peripheral surface defining the hollow space of the spool.

2. The printing device according to claim 1, further comprising an urging member urging the first gear in a second direction opposite the first direction.

3. The printing device according to claim 1, wherein:

in the second case, where the second cassette type without the pressure portion is attached to the cassette receiving portion, the movable member does not move in the first direction to maintain the first gear at the first position.

4. A printing device comprising:

a print head;

a platen roller positioned to face the print head;

a motor configured to generate a driving force to rotate the platen roller;

a cassette receiving portion configured to detachably receive a cassette, the cassette incorporating a printing tape to be printed by the print head, and the cassette being attachable to the cassette receiving portion in a first direction; and a power transmission portion configured to transmit the driving force of the motor to the platen roller, the power transmission portion comprising a plurality of gears including a first gear movable from a first position to a second position downstream of the first position in the first direction, the power transmission portion being configured to switch a ratio of a rotation number of the platen roller to a rotation number of the motor depending on whether the first gear is at the first position or at the second position to transmit the driving force to the platen roller; and a movable member provided at the cassette receiving portion and movable in the first direction, wherein the first gear is moved from the first position to the second position in association with movement of the movable member in the first direction;

the cassette being one of a first cassette type and a second cassette type, the cassette receiving portion configured to both (a) receive the first cassette type so as to provide a first printing device arrangement of a first case, and (b) receive the second cassette type so as to provide a second printing device arrangement of a second case, the first cassette type includes a pressure portion configured to contact the movable member, and the second cassette type does not include a pressure portion configured to contact the movable member, in the first case, in which the first cassette type including the pressure portion is attached to the cassette receiving portion, the pressure portion contacts and moves the movable member in the first direction to move the first gear from the first position to the second position, in the second case, in which the second cassette type without the pressure portion is attached to the cassette receiving portion, the first gear is maintained at the first position, wherein the plurality of gears of the power transmission portion further includes a second gear and a third gear, positions of the second gear and the third gear being different from each other in the first direction, and wherein (a) the first gear meshingly engages the second gear when the first gear is at the first position, and (b) the first gear meshingly engages the third gear when the first gear is at the second position.

5. A printing device comprising:

a print head;

a platen roller positioned to face the print head;

a motor configured to generate a driving force to rotate the platen roller;

a cassette receiving portion configured to detachably receive a cassette, the cassette incorporating a printing tape to be printed by the print head, and the cassette being attachable to the cassette receiving portion in a first direction; and a power transmission portion configured to transmit the driving force of the motor to the platen roller, the power transmission portion comprising a plurality of gears including a first gear movable from a first position to a second position downstream of the first position in the first direction, and the power transmission portion being configured to switch a ratio of a rotation number of the platen roller to a rotation number of the motor depending on whether the first gear is at the first position or at the second position to transmit the driving force to the platen roller, wherein the plurality of gears of the power transmission portion further includes:

an input gear;

a sun gear integrally rotatable with the input gear;

a planetary gear meshingly engaging the sun gear and orbitally rotatable about the sun gear; and an output gear rotatable in association with orbital movement of the planetary gear, and wherein the first gear meshingly engages one of the input gear and the output gear when the first gear is at the first position, and the first gear meshingly engages a remaining one of the input gear and the output gear when the first gear is at the second position.

* * * * *